United States Patent [19]
Kolb et al.

[11] Patent Number: 5,526,468
[45] Date of Patent: Jun. 11, 1996

[54] METHOD AND APPARATUS FOR SMOOTHING AN EXPANDED BITMAP FOR TWO-STATE IMAGE DATA

[75] Inventors: Joseph P. Kolb; Kenneth R. Woodruff, both of Lexington, Ky.

[73] Assignee: Lexmark International, Inc., Greenwich, Conn.

[21] Appl. No.: 413,023

[22] Filed: Mar. 27, 1995

[51] Int. Cl.$^6$ .................................................. G06K 15/00
[52] U.S. Cl. ........................................... 375/102; 395/115
[58] Field of Search ..................................... 395/102, 109, 395/115, 116, 128, 164–166; 358/532, 531, 298, 448, 451; 345/132, 127, 136; 382/298, 299, 300, 254, 258, 266, 267, 268

[56] References Cited

U.S. PATENT DOCUMENTS

| | | | |
|---|---|---|---|
| 4,437,122 | 3/1984 | Walsh et al. | 358/166 |
| 4,725,892 | 2/1988 | Suzuki et al. | 358/287 |
| 4,763,279 | 8/1988 | Kellam et al. | 364/518 |
| 5,005,139 | 4/1991 | Tung | 364/519 |
| 5,029,108 | 7/1991 | Lung | 364/519 |

*Primary Examiner*—Arthur G. Evans
*Attorney, Agent, or Firm*—Frederick H. Gribbell

[57] ABSTRACT

A method for smoothing expanded bitmap data is provided for use in laser printers or computers that use two-state, two-dimensional image data created by word processors, computer-aided drafting systems, and the like. The method would typically be utilized within a laser printer at its common graphics engine, just after the input source data has been rasterized. The source bitmap data having low-resolution pels is first divided into higher resolution pels, and the appearance of its diagonal lines would otherwise have a jagged appearance if such data is not smoothed. Once the expansion factor is determined, the present method takes pel data in word-sized portions and performs (in an Outer Loop) various logical operations upon these words of data to smooth adjacent rows of the higher-resolution pels. Each pair of words of pels is evaluated through a series of logical operations in an Inner Loop, before indexing to the next group of pels in the same row and starting a new Outer Loop. Once the end of the line has been reached, the method automatically seeks data from two rows of pels at a Y-axis position that is one step lower with respect to the low-resolution pels from the source data file. The same logical operations are again performed on each pair of words of pels until the entire line has been smoothed. These operations continue until the entire bitmap has been smoothed, and the logical operations occur very quickly so as to not slow down the overall operation of the laser printer.

22 Claims, 28 Drawing Sheets

2X EXPANSION

[PROCESS ROWS 2 & 3]

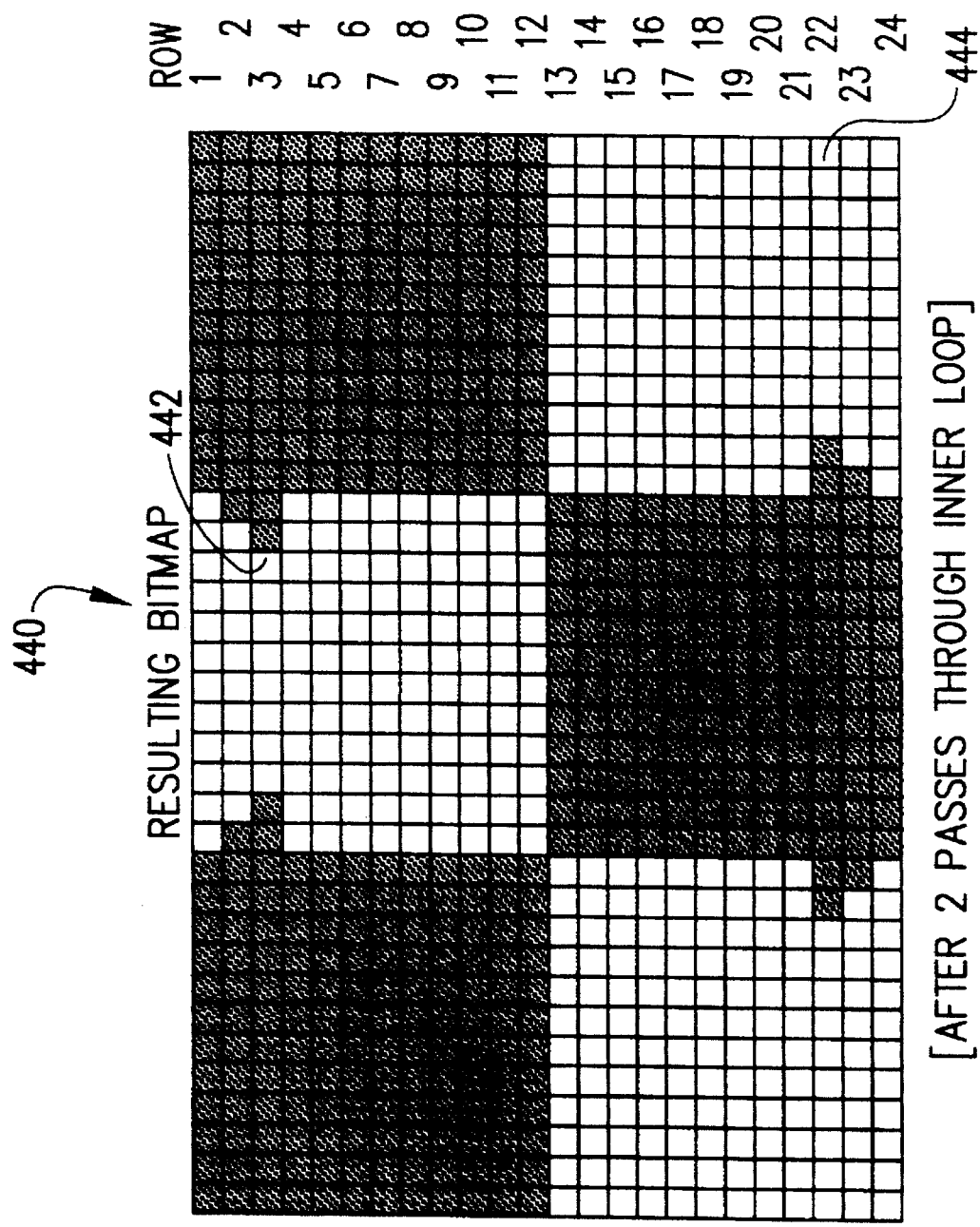
FIG. 11A [AFTER 2 PASSES THROUGH INNER LOOP]

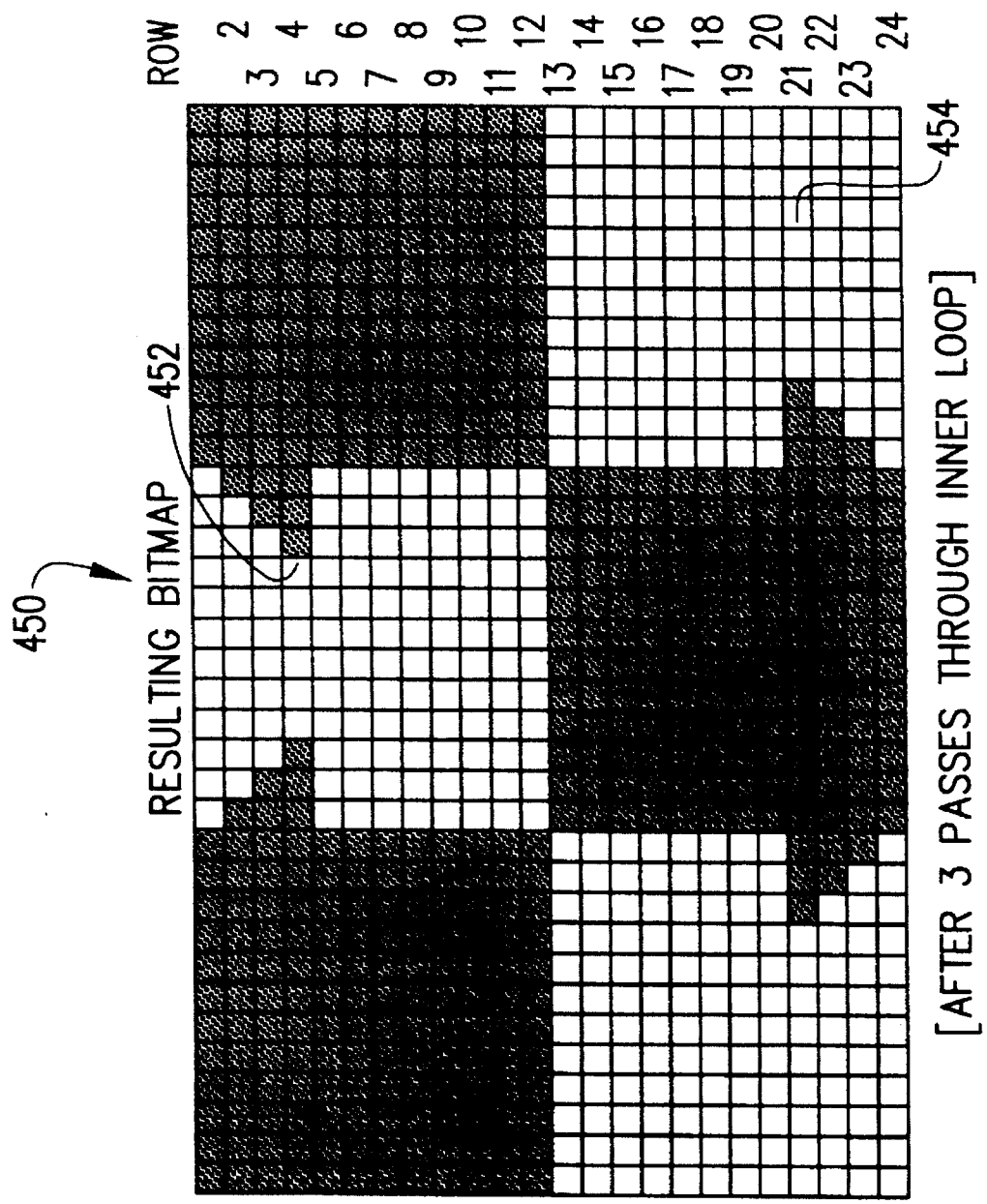
FIG. 11B [AFTER 3 PASSES THROUGH INNER LOOP]

1

METHOD AND APPARATUS FOR SMOOTHING AN EXPANDED BITMAP FOR TWO-STATE IMAGE DATA

TECHNICAL FIELD

The present invention relates generally to high-resolution laser printers and is particularly directed to a laser printer of the type which can accept as input data a low-resolution data file to be printed. The invention is specifically disclosed as a method for smoothing an expanded bitmap of the original low-resolution image data, in order to take advantage of the higher resolution capability of the laser printer.

BACKGROUND OF THE INVENTION

Laser printers have been a relatively recent improvement over dot matrix and ink jet-type printers typically used with personal computers or workstations. A typical resolution in dots per inch (dpi) of an ink jet printer was 300 dpi, whereas most laser printers have an improved resolution of 600 dpi.

Further advancements in laser printers have now made it possible to manufacture such printers having an even more improved resolution of 1200 dpi. Many existing computer files, however, are not in a position to immediately take advantage of the higher resolution capabilities of such latest laser printers. Some of these computer files are word processor data files or computer-aided-drafting (CAD) data files, and were originally created to be printed at only 300 dpi or 600 dpi during a time when those lower resolution capabilities were the best that was available. A 300 dpi or 600 dpi data file can be expanded into a 1200 dpi file quite easily by halving the physical size of each of the dots (or pels) and doubling the number of such pels per unit distance. This expansion would take place in both the horizontal and vertical directions.

Unfortunately, a simple expansion of the bitmap resolution from 300 dpi to 1200 dpi, or from 600 dpi to 1200 dpi (at either a four-times or two-times expansion factor) does not result in a printed page having an appearance any better than the originally printed page at the lower resolution. In fact, the expanded printed page may have diagonal lines that actually appear to be more jagged than the original page when printed using a lower resolution printer, because the higher resolution laser printer can more accurately place each of the dots on the printed page such that the expanded resolution printed page will be even more accurate and have a sharper line delineation than the original printed page. This would be true whether the bitmap data represented alphanumeric data (i.e., letters and numbers) or drawing data created by a CAD or other graphical data system.

The need for a "smooth" expanded bitmap image has been addressed in the prior art, particularly by U.S. Pat. No. 4,437,122 (Walsh et al.). Walsh enhances the resolution quality of alphanumeric characters for a system that receives bitmap information initially in the form of pixels for a video display, then provides a hard copy output (via a printer). Walsh analyzed successive lines of video data by comparing pixels on three successive lines that surround each specific individual pixel to be analyzed, to determine if any of the edges of the specific pixel being analyzed should be rounded off or have its diagonal edges smoothed. After the analysis of the individual pixel has occurred, the apparatus of Walsh generates an identifier that uniquely describes the isolated pixel pattern (i.e., the pattern surrounding the specific pixel of interest), then compares the identifier with standard pixel formats that are already stored in a memory in the form of a look-up table, then enhances the pixel of interest by replacing it with the appropriate standard pixel format (from the look-up table).

While the Walsh apparatus is an improvement over a completely unsmooth expanded bitmap, the processing time required to analyze the pixel pattern around the particular pixel of interest could greatly slow down the printing process for a laser printer, and also requires a look-up table for each font desired to be used in a particular laser printer system. Furthermore, it would not be readily usable for graphical data in the form of drawings, such as those generated by a CAD system.

SUMMARY OF THE INVENTION

Accordingly, it is a primary object of the present invention to provide a method of smoothing expanded bitmaps of two-state image information to take advantage of the higher resolution available in modern laser printers that are used to print older data files that were created for lower resolution printers.

It is a further object of the present invention to provide a laser printer having an improved resolution that can accept as input lower resolution data files, yet print such data files at its higher resolution while smoothing the bitmap for a better appearance.

It is another object of the present invention to provide a method for smoothing two-state bit map image data using a universal series of logical operations to convert a source bitmap of a lower resolution into a higher resolution bitmap, in which the method steps do not depend upon seeking or evaluating any special locations where certain transitions occur in the original data of the source bitmap.

It is yet a further object of the present invention to provide a method for smoothing two-state bitmap image data using a universal series of logical operations regardless of the integer value of the expansion factor used in converting the source bitmap to the higher resolution output bitmap.

It is yet another object of the present invention to provide a method for smoothing two-state bitmap image data in which the logical operations can be executed quickly enough in real time so as to not appreciably slow down the printing speed of a laser printer that is producing the higher resolution hard copy.

It is a further object of the present invention to provide a method for smoothing two-state bitmap image data that can be executed either within a laser printer or within a separate computer that performs a rasterization process on two-dimensional image data.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved laser printer is provided that can take advantage of its higher resolution capabilities while at the same time accepting as input two-state text data or image data that is formatted for a lower resolution while "smoothing" the expanded bitmap that is created at the higher resolution. The method for smoothing the expanded bitmap image data can best utilize bitmap data files that contain square pels, and which are to be expanded by an integer multiple in both the X-axis and Y-axis. The smoothing expansion procedure can be implemented either within the laser printer itself, or within a separate computer that either rasterizes the two-dimensional data before sending it to a printing device, or accepts data from another computing or storage device in which the image data has already been rasterized.

In the situation where the smoothing expansion procedure is to occur within a laser printer, it is preferred that the required logical operations occur in the common graphics engine of the laser printer, just after the source bitmap data has been rasterized. Once a particular bitmap has been rasterized, which may contain image data for an entire page to be printed by the laser printer, the lower resolution pels or dots are then divided into smaller but more numerous pels by an integer multiple known as the expansion factor. For example, if a 300 dpi source file is to be printed at 1200 dpi, the expansion factor would be equal to a value of four, and each source bitmap pel will be divided into sixteen (4 by 4) higher resolution pels, which can be individually printed by the print engine of the laser printer.

Once the expansion factor is known, the method utilizes simple arithmetic and logical operations to shift to the rows of higher-resolution data, and to load portions of two rows at a time (in bit groups called "words" that typically correspond to the bit size of the accumulators and other registers of a microprocessor in the laser printer) to be operated upon to create the smoothing effect. The two rows of interest occur at a transition boundary, which corresponds to the delineation between the lines of low-resolution pels in the source bitmap data set. The data in the words of these two rows are loaded into two registers, and four other similarly sized registers are required to temporarily hold pel data during the logical operations that make up this portion, referred to as an "Outer Loop," of the method of the present invention. The pels in the first row are shifted to the left by one or more pels, and the result is AND-ed to the contents of the second register that holds the second row of pels. The result of that AND-operation is stored in a third register, also called the WORK register #1 (WORK REG.1). The second row of pels is then shifted one or more pels to the left, then AND-ed to the original contents of the first row of pels, and that result is stored in a fourth register, also known as the WORK register #2 (WORK REG.2).

The fifth and sixth registers are initially cleared, but they will later hold nonzero data that will be utilized in later passes through the "Inner Loop" of the logical operations. At this time, the third register is OR-ed with the fifth register, and the result is then stored in that fifth register, also called the SMOOTH register #1 (SMOOTH REG.1). The fourth register is then OR-ed with the sixth register, and the result placed into the sixth register, which is also called the SMOOTH register #2 (SMOOTH REG.2).

After this occurs, registers #1 and #2 have their contents each shifted to the right by 1 or more pels then AND-ed with their opposite unchanged registers, and the individual results are stored into either the third or fourth registers, as before. The third and fifth registers are then OR-ed, and the result stored in the fifth register, as before. The fourth and sixth registers are then OR-ed, with the result stored into sixth register, as before.

At this point, the fifth and sixth registers (i.e., SMOOTH REG.1 and SMOOTH REG.2) are in condition to be used to create smoothed bitmap rows by being OR-ed into the respective rows of the original bitmap (i.e., the bitmap that has already been expanded). The respective row that the contents of register #5 are to be OR-ed with is determined by a mathematical expression that depends upon the expansion factor, which line of original low-resolution data is now being expanded and smoothed, and which pass through the Inner Loop is now being executed. The respective row which is to be OR-ed with the contents of the sixth register is dependant upon a different mathematical expression that depends upon the same quantities as listed in the previous sentence. For any expansion factor greater than two (2), there will be more than one pass through the Inner Loop for each word of pels to be smoothed for each pair of rows. All of the OR-operations and AND-operations are part of the Inner Loop, and once each Inner Loop has been executed, the method determines whether or not a subsequent Inner Loop must be entered before moving on to the next word of pels to be smoothed. The number of passes through the Inner Loop is always one less than the integer value of the expansion factor, e.g., if the expansion factor is four (4), then the number of passes through the Inner Loop will be three (3).

Once the last pass through the Inner Loop has been accomplished, a new Outer Loop will be executed, and the next word of bitmap data in the same rows will be then loaded into the first two registers (unless we have reached the end of a line). A certain amount of overlap is required to smooth all of the pels, however, this is simply accomplished by pointing (i.e., by shifting) to the most-right pel in the previous word, and making that pel the most-left pel in the next word to be operated upon. Once the new bitmap data has been loaded into the first two registers, all of the other Inner Loop operations are performed as related above, until all of the passes through the Inner Loop have been accomplished for this particular Outer Loop. These steps continue throughout all of the bitmap data for the first two rows, until the end of the line is reached. Once that occurs, the method loads data in from the next two rows of interest which occur at the next transition boundary, thereby starting a new Outer Loop. Once these two rows are determined and their first word of data loaded into registers #1 and #2, the Inner Loop steps are executed as related above in a repetitive and progressive cycle until all of the words of that set of lines has been operated upon, and the end of the line has been reached.

An "Outer Loop" occurs per each set of Inner Loops that are required to fully smooth a particular word of bitmap data that has been loaded into registers #1 and 2. A new Outer Loop is entered every time the pointer that determines which group of pels in a particular row of data is to be used as the next word to be operated upon by the logical operations of the Inner Loop. A new Outer Loop also occurs every time the end of the line is reached and the Y-axis transitions down to the next line before determining which group of pels is to be loaded into registers #1 and 2.

The shifting to new pairs of words located in the X-axis and the Y-axis occurs progressively over and over until the entire bitmap has been operated upon. Although the entire bitmap is to be operated upon by the method of the present invention, such data processing requires very little real time since no evaluations of any particular pixel or pel patterns is required to implement the present invention. Instead, every row that is to be operated upon is easily determined by the mathematical and/or logical expressions utilized by the present invention, and all of the actual data manipulations are simple logical or Boolean operations that require minimal cycles of a microprocessor. In essence, the printing operation of the laser printer is not noticeably delayed (or is not delayed at all) as compared to its normal printing operations if the expanded bitmap were not be smoothed.

The method of the present invention can be utilized by any laser printer or by any computer that uses rasterized two-dimensional image data. The bit size of the microprocessor used in the computer or laser printer will restrict the number of low-resolution pels that can be smoothed during any set of Inner Loops of the procedure of the present invention. For example, if a four-times bitmap expansion is to be accomplished, then each word of a sixteen-bit microprocessor will contain only four (4) pels of the low-resolution data. Obviously, if a 32-bit microprocessor is used, then eight (8) pels of low-resolution data could be operated upon during any particular set of Inner Loops of the present invention. Such performance restrictions would be known in advance for any particular computer or laser printer, and the operating software would be written accordingly.

A standard sequential microprocessor can readily be used to perform the necessary steps of the present invention, or a parallel processing machine could be used if even greater speed is desirable. For example, a parallel processing system could load several different words for Inner Loop operations to execute all of the necessary steps of an Outer Loop much more quickly across a particular line of bitmap data. This parallel processing system could be utilized either within the laser printer itself, or by a separate computer that would output already rasterized image data to a high-resolution printer.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 11A is a two-dimensional representation of the 12× expanded, partially smoothed high-resolution bitmap image of FIGS. 10A and 10J at the end of the second pass through the Inner Loop.

FIG. 11B is a two-dimensional representation of the 12× expanded, partially smoothed high-resolution bitmap image of FIGS. 10A and 11A at the end of the third pass through the Inner Loop.

DETAILED DESCRIPTION OF THE PREFERRED EMBODIMENT

Figure 1:
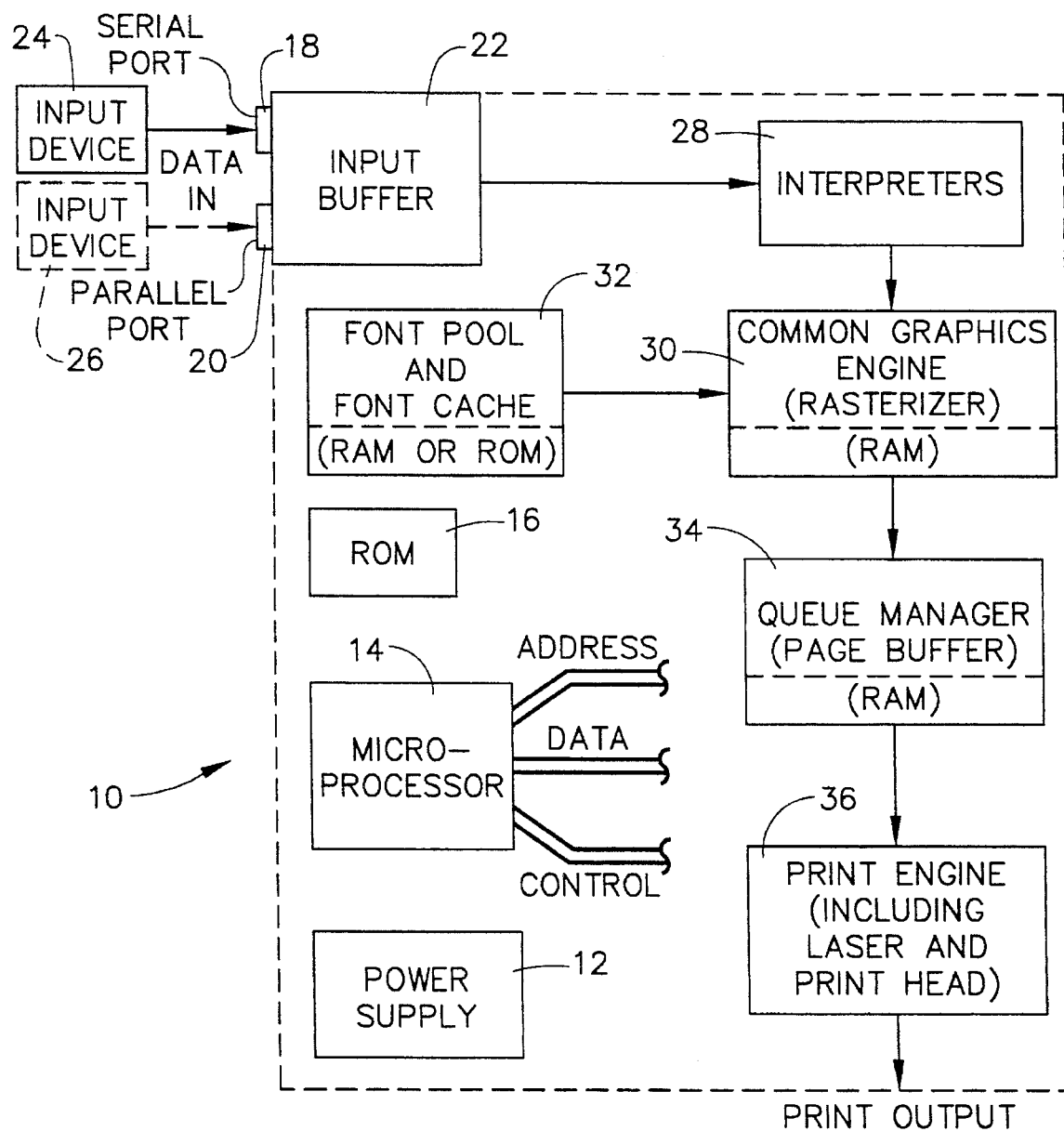
FIG. 1 is a hardware block diagram of the major components used in a laser printer constructed according to the principles of the present invention.

Reference will now be made in detail to the present preferred embodiment of the invention, an example of which is illustrated in the accompanying drawings, wherein like numerals indicate the same elements throughout the views. Referring now to the drawings, FIG. 1 shows a hardware block diagram of a laser printer generally designated by the index numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided into several portions for performing several different functions.

Laser printer 10 will also contain at least one serial input or parallel input port, or in many cases both types of input ports, as designated by the index numeral 18 for the serial port and the index numeral 20 for the parallel port. Each of these ports 18 and 20 would be connected to a corresponding input buffer, generally designated by the index numeral 22 on FIG. 1. Serial port 18 would typically be connected to a serial output port of a personal computer or a workstation that would contain a software program such as a word processor or a graphics package or computer aided drawing package. Similarly, parallel port 20 could also be connected to a parallel output port of the same type of personal computer or workstation containing the same type of programs, only the data cable would have several parallel lines, instead of only a pair of wires that makes up many serial cables. Such input devices are designated, respectively, by the index numerals 24 and 26 on FIG. 1.

Once the text or graphical data has been received by input buffer 22, it is commonly communicated to one or more interpreters designated by the index numeral 28. A common interpreter is PostScript, which is an industry standard used by most laser printers. After being interpreted, the input data is typically sent to a common graphics engine to be rasterized, which typically occurs in a portion of RAM designated by the index numeral 30 on FIG. 1. To speed up the process of rasterization, a font pool and possibly also a font cache is stored, respectively, in ROM or RAM within most laser printers, and these font memories are designated by the index numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a queue manager or page buffer, which is a portion of RAM designated by the index numeral 34. In a typical laser printer, an entire page of rasterized data is stored in the queue manager during the time interval that it takes to physically print the hard copy for that page. The data within the queue manager 34 is communicated in real time to a print engine designated by the index numeral 36. Print engine 36 includes the laser and the print head, and its output is the physical inking onto a piece of paper, which is the final print output from laser printer 10. It will be understood that the address, data, and control lines are typically grouped in buses, and which are physically communicated in parallel (sometimes also multiplexed) electrically conductive pathways around the various electronic components within laser printer 10. For example, the address and data buses are typically sent to all ROM and RAM integrated circuits, and the control lines or interrupt lines are typically directed to all input or output integrated circuits that act as buffers.

If laser printer 10 has a high enough resolution, it can potentially accept input data having a rather coarse bitmap resolution, such as 150 or 300 dots per inch (dpi), and can expand, by use of the method and apparatus of the present invention, this rather coarse bitmap resolution into a higher and more useful resolution such as 600 dpi or 1200 dpi. Such bitmap expansion would take place in the common graphics engine 30, where the lower resolution font pool and font cache information is derived, and then "smoothed" to make use of the higher resolution that laser printer 10 is capable of.

Figure 2A:
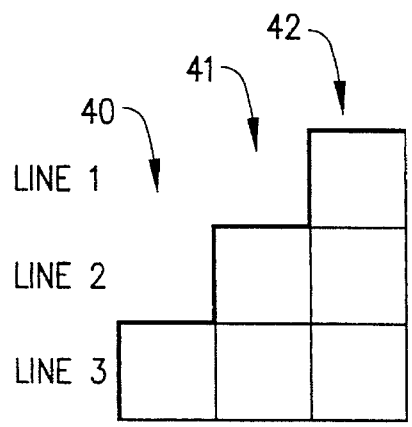
FIG. 2A is a two-dimensional representation of a low-resolution bitmap image.

For example, if an original "coarse" bitmap has a resolution of 300 dpi, as depicted on FIG. 2A, each of its print elements or "pels" will have the appearance of a square that can occupy substantially an entire line and column (or channel) of space on the page after printing. If laser printer 10 has a resolution greater than 300 dpi (such as either 600 or 1200 dpi), it can expand the 300 dpi bitmap of FIG. 2A using the method and apparatus of the present invention into a 600 dpi expanded bitmap, as viewed in FIG. 2B. In such a circumstance, lines 1, 2, and 3 are now printed as rows 1–6, in which line 1 is converted into rows 1 and 2, line 2 is converted into rows 3 and 4, and line 3 is converted into rows 5 and 6. In a similar manner, each of the vertical columns or channels (i.e., index numerals 40, 41, and 42) of the 300 dpi bitmap of FIG. 2A can be expanded into twice as many corresponding columns (i.e, index numerals 43–48), as viewed in FIG. 2B.

Figure 2B:
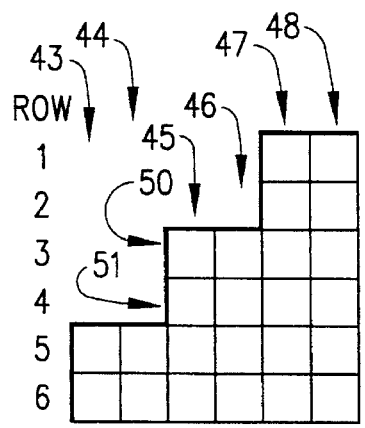
FIG. 2B is a two-dimensional representation of a 2× expanded, unsmoothed high-resolution bitmap image that is equivalent to the low-resolution bitmap image of FIG. 2A.
Figure 2C:
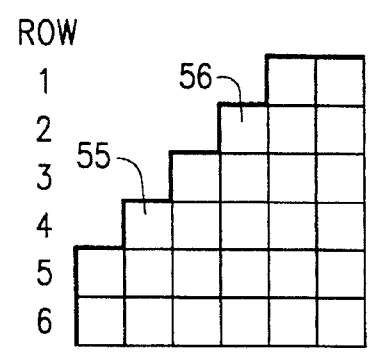
FIG. 2C is a two-dimensional representation of an expanded and smoothed high-resolution bitmap image that is equivalent to the high-resolution bitmap image of FIG. 2B

As can be easily discerned from viewing FIGS. 2A and 2B, a simple expansion from 300 dpi to 600 dpi does not improve the printed image that would be output from laser printer 10, and would not take advantage of laser printer 10's greater resolution capabilities. In fact, an expanded bitmap as per FIG. 2B can actually appear to be even less smooth (i.e., more jagged) than the more coarse resolution 300 dpi rendition shown in FIG. 2A, because a 600 dpi resolution laser printer will print each of the square pels with a greater precision and sharpness than similar pels printed by a 300 dpi laser printer. Therefore, it is quite advantageous to be able to "smooth" the diagonal line along the edge between pels to be printed and pels to not be printed, as can be seen in FIG. 2C. The differences between FIGS. 2B and 2C are that two extra pels have been added at intermediate steps so as to make FIG. 2C appear to be a smoother staircase (i.e., where the steps are more frequent but of less individual height).

Figure 2D:
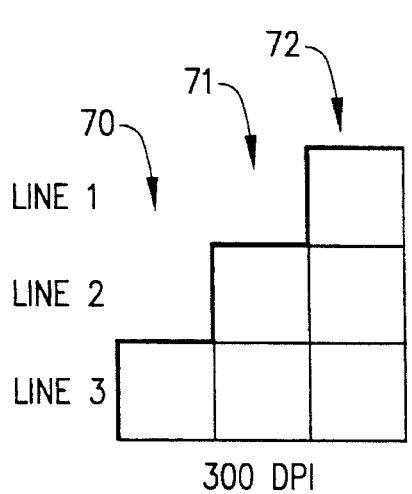
FIG. 2D is a two-dimensional representation of a low-resolution bitmap image, identical to that of FIG. 2A.
Figure 2E:
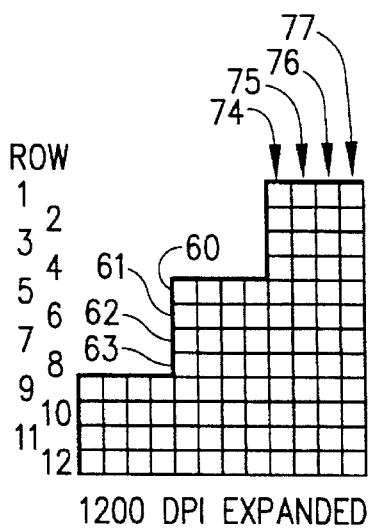
FIG. 2E is a two-dimensional representation of a 4× expanded, unsmoothed high-resolution bitmap image that is equivalent to the low-resolution bitmap image of FIG. 2D.
Figure 2F:
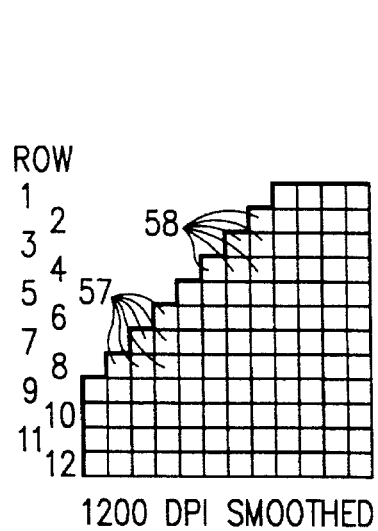
FIG. 2F is a two-dimensional representation of an expanded and smoothed high-resolution bitmap image that is equivalent to the high-resolution bitmap image of FIG. 2E.

In the present invention, the number of pels being added to each jagged diagonal line to smooth it out depends upon the amount that the bitmap of an individual character has been expanded. In the example expansion shown in FIGS. 2A and 2C, a two times (or 2×) expansion has occurred, which only requires one pel to be added for each jagged transition between lines (on FIG. 2A) at the locations designated by the index numbers 55 and 56. If a four times (or 4×) expansion were desired, such as depicted in FIGS. 2D, 2E, and 2F, then a six pel pattern must be added for each of the original lines from FIG. 2D at the locations designated by the index numerals 57 and 58. FIG. 2D depicts the same three line and three channel bitmap at 300 dpi as was provided in FIG. 2A. FIG. 2E shows a four times expansion of that same bitmap as printed by a 1200 dpi laser printer. FIG. 2E shows only a simple four times expansion without any smoothing, and for the same reasons related above, the actual printed rendition on a piece of paper would appear to be even more jagged than the original 300 dpi rendition that would be printed by a laser printer having less capability.

To take advantage of a laser printer having a 1200 dpi resolution, it is preferred that the diagonal line be "smoothed," as depicted in FIG. 2F, so that each of the original lines is converted into four individual rows such that each step of the "staircase" is only one fourth as high along the Y-axis and occurs four times more frequently when moving along the X-axis. It will be understood that the original columns or channels of FIG. 2D (designated by the index numerals 70–72) have also been multiplied into sets of four higher resolution columns, as depicted in FIGS. 2E and 2F (designated, e.g., by the index numerals 74–77). The six-pel pattern that needs to be added to each low-resolution diagonal transition can easily be found by comparing FIG. 2F (after the smoothing effect) to FIG. 2E (before the smoothing effect), as indicated either by index numeral 57 or 58.

It will be understood that the smoothing effect depicted on FIGS. 2A–2F are most useful for bitmap patterns that have pels that are square in shape. Furthermore, any integer multiple expansion can be smoothed using the techniques disclosed herein without departing from the principles of the present invention. It will also be understood that the smoothing technique disclosed herein can be utilized with any rasterized image that meets the requirements described above, whether that rasterized image is a representation of a printed page or of a video display, or some other type of physical rendition of a two-state bitmap image. The term two-state image refers to an image that is in black and white or some other two-color pattern, but not one having a variable Gray scale or of full color images. It will be understood that the bitmap patterns depicted in FIGS. 2A–2F represent the dark or black portions of a rasterized image to be displayed on a video display or to be printed on a page.

The smoothing procedure, as performed within a laser printer 10, requires four initial parameters. These parameters are the: address, height, width, and scaled amount of the bitmap to be smoothed. The address of the bitmap is used to initialize the indexing to the bitmap. The height and width of the bitmap are used to determine the size of the lines and number of channels (columns), and the scale amount is needed to determine which lines need to be examined for possible smoothing. The scale amount indicates how many times a row pattern is repeated (at the new, higher resolution), and for example, a scale amount of two (a 2× expansion) indicates that row patterns are repeated two times, and a scale pattern of four (a 4× expansion) indicates that rows are repeated four times. A quick inspection of FIGS. 2B and 2E will make apparent this two-times or four-times repeated row pattern, at the index numerals 50 and 51 on FIG. 2B and 60, 61, 62, and 63 on FIG. 2E.

Figure 3A:
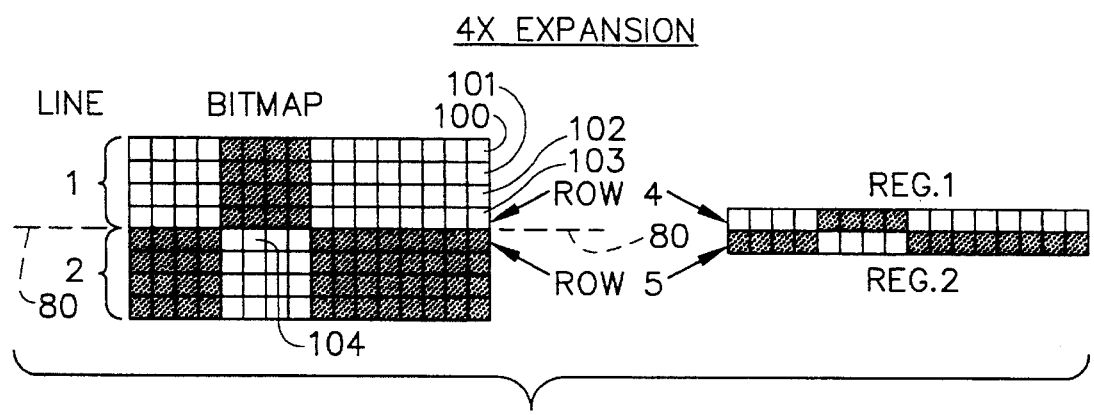
FIG. 3A is a two-dimensional representation of a 4× expanded, unsmoothed high-resolution bitmap image at the beginning of a smoothing procedure.

Because the row patterns repeat according to the scale amount (i.e., the expansion factor), it is only necessary to examine the rows where the bitmap pattern changes, which occurs at row increments equal to the numeric value of the scale amount (expansion factor) and the very next row after that. The boundary between these two rows is referred to as the transition boundary, designated by the index numeral 80 on FIG. 3A, which is easily seen as the boundary between the original lines 1 and 2 of the coarse, low resolution bitmap on FIG. 3A, and which is also the boundary between the expanded bitmap, high resolution rows 4 and 5. Since the expansion factor in FIG. 3A is equal to four, the fact that the transition boundary is between rows 4 and 5 follows the rule stated above. As further examples of determining the rows for the bit map pattern changes, bitmaps with a scale amount or expansion factor equal to two (2) will have a pattern change between rows 2 and 3, rows 4 and 5, row 7 and 8, and so on. These pattern changes occur at the transition boundaries. Bitmaps having a scale amount or expansion factor of four (4) will have pattern changes between rows 4 and 5, rows 8 and 9, rows 12 and 13, and so on (which also correspond to the transition boundaries).

In FIG. 3A, since the expansion factor is equal to four (4), the bitmap patterns of rows 1, 2, and 3 can be ignored, and only the bitmap patterns of rows 4 and 5 need be inspected because they surround the transition boundary 80. Rows 1–4 correspond to the original low-resolution line 1, and are depicted by the index numerals 100, 101, 102, and 103. In the example of FIG. 3A, a 16-bit word is depicted for each of the rows 1–8, as this would be a typical size of a register or an accumulator in a 16-bit microprocessor. The contents of row 4 are placed into a first register, designated register #1 (REG.1 ), and the contents of row 5 are placed into a second register (REG.2).

Figure 3B:
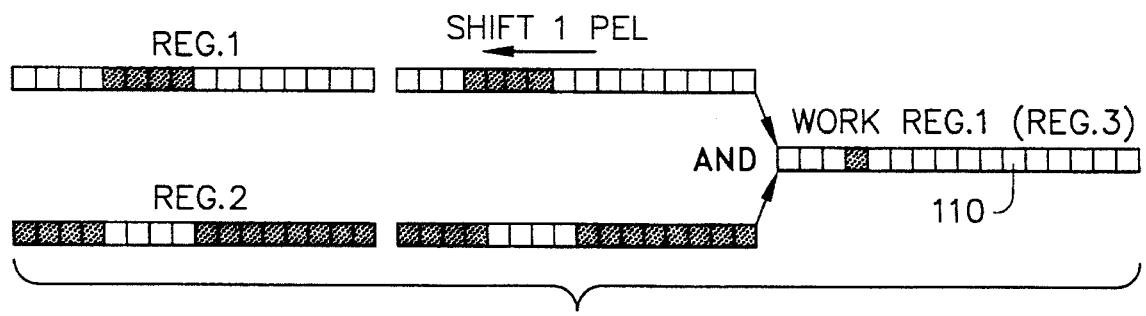
FIGS. 3B–3I are diagrams showing the logical data manipulations of the first pass through the Inner Loop to smooth the two-dimensional bitmap image of FIG. 3A.
Figure 3C:
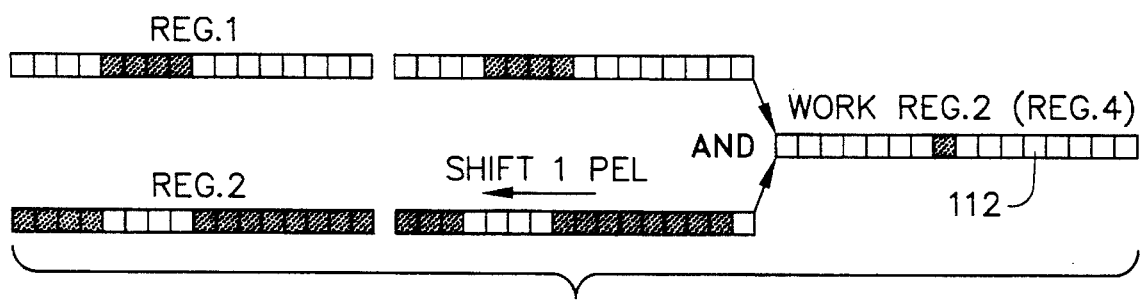
Figure 3D:
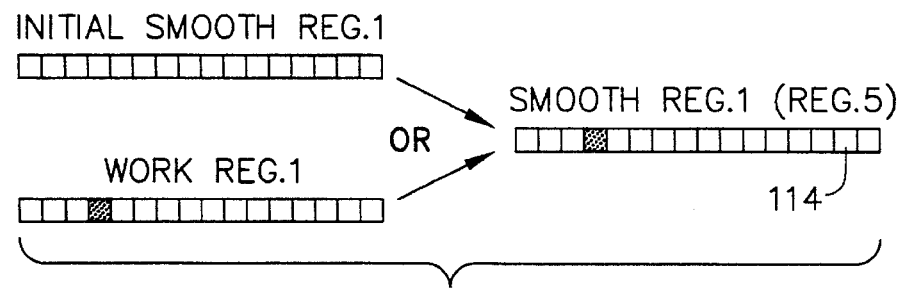
Figure 3E:
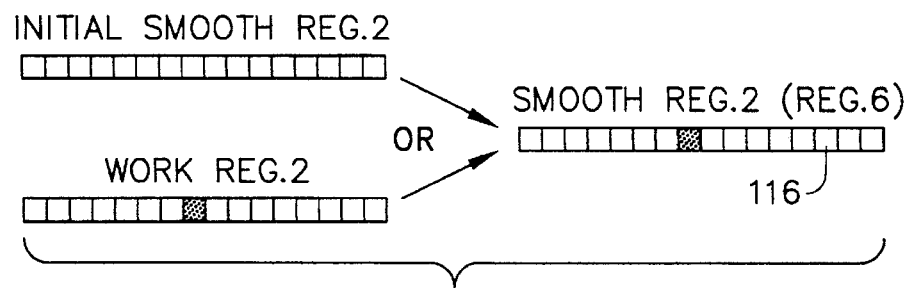

The next step of the 4× expansion is depicted in FIG. 3B, in which the contents of register #1 (REG.1) are shifted to the left by one pel, and the result is AND-ed to the contents of register #2 (REG.2). The result of this AND-operation is stored in a third register, designated WORK REG.1 (at index numeral 110). In FIG. 3C, the next step of the method is depicted in which the contents of REG.2 are shifted one pel to the left, and the result is AND-ed to the original contents of REG.1, then stored in a fourth register called WORK REG.2 (at index numeral 112). The next step, depicted in FIG. 3D, takes the contents of WORK REG.1 and OR's it to an initially cleared fifth register, called SMOOTH REG.1, and the result of this OR-operation is stored in SMOOTH REG.1 (at index numeral 114). In FIG. 3E, the next step similarly takes the contents of WORK REG.2 and OR's it with an initially cleared sixth register, called SMOOTH REG.2, and the result of this OR-operation is stored in SMOOTH REG.2 (at index numeral 116).

Figure 3F:
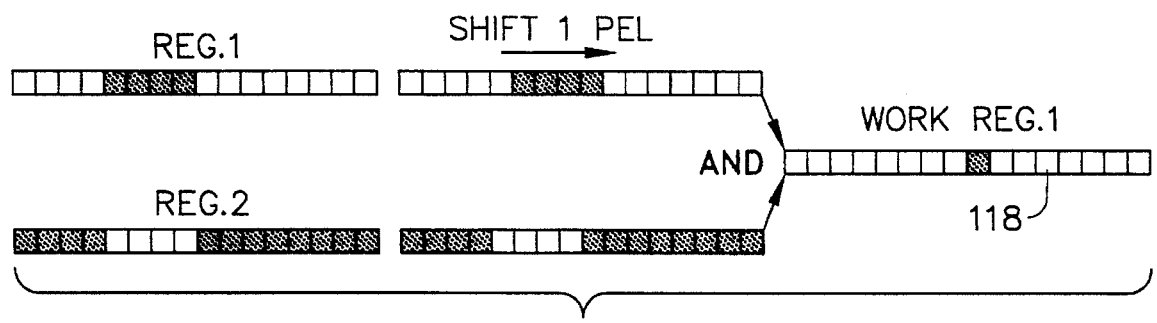
Figure 3G:
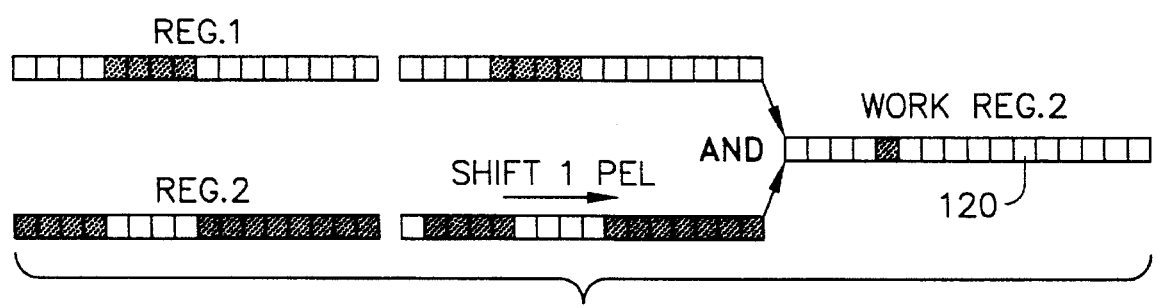
Figure 3H:
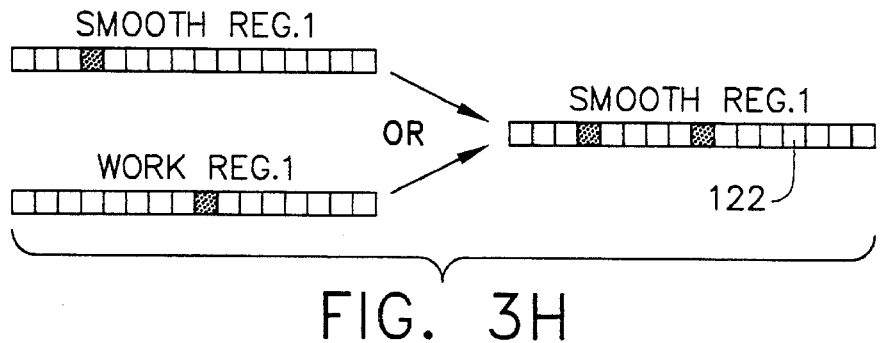
Figure 3I:
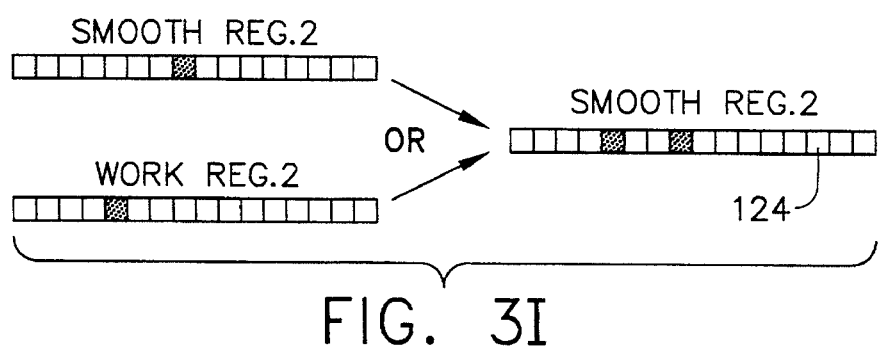

At this point, the next step, depicted in FIG. 3F, is to shift the contents of register #1 (REG.1 ) to the right by one pel, then AND the result to the contents of register #2 (REG.2), and store the result into WORK REG.1 (at index numeral 118). The next step, depicted in FIG. 3G, is to shift one pel to the right the contents of REG.2, AND the result to the original contents of REG.1, then store the results into WORK REG.2 (at index numeral 120). The next step is to OR the contents of WORK REG.1 to the fifth register (SMOOTH REG.1), and place the results into SMOOTH REG.1 (at the index numeral 122), as depicted in FIG. 3H. In FIG. 3I, the next step similarly takes the contents of WORK REG.2 and OR's it with the sixth register (SMOOTH REG.2), and the result of this OR-operation is stored in SMOOTH REG.2 (at index numeral 124).

Figure 3J:
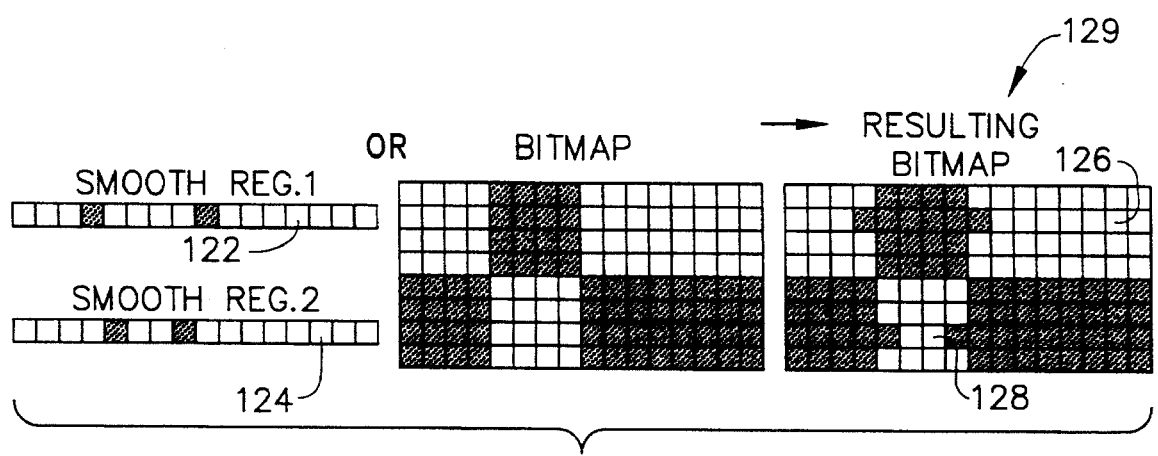
FIG. 3J is a two-dimensional representation of the 4× expanded, partially smoothed high-resolution bitmap image of FIG. 3A at the end of the first pass through the Inner Loop.

At this point in the process, the contents of SMOOTH REG.1 and SMOOTH REG.2 are correctly configured to be used to modify the original bitmap. As depicted in FIG. 3J, SMOOTH REG.1 is OR-ed to row 2 of the original bitmap, and SMOOTH REG.2 is OR-ed to Row 7 of the original bitmap. The result, as seen in FIG. 3J, is the "resulting bitmap," generally designated by the index numeral 129, in which row 2 has been modified (as seen at index numeral 126), and row 7 has been modified (as seen at index numeral 128). A detailed explanation is provided below as to why rows 2 and 7 are chosen as the respective rows for the OR-operations with the two smooth registers, and the flow chart of FIGS. 6A and 6B sets forth the exact method steps for determining the correct rows for these OR-operations.

Figure 4A:
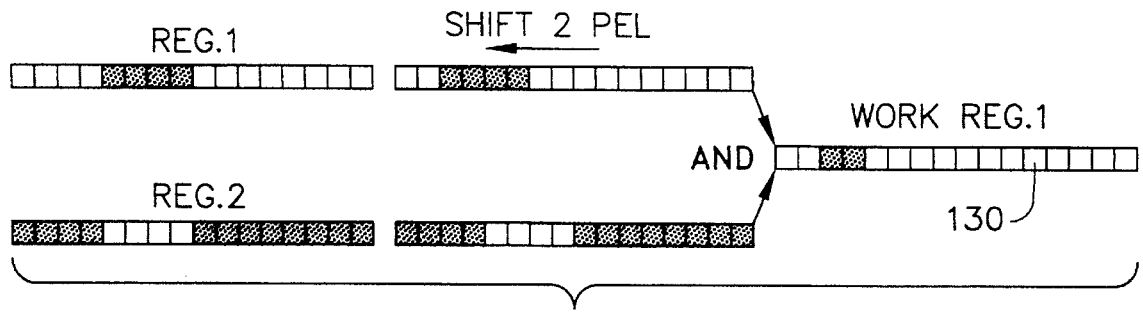
FIGS. 4A–4H are diagrams showing the logical data manipulations of the second pass through the Inner Loop to smooth the two-dimensional bitmap image of FIGS. 3A and 3J.
Figure 4B:
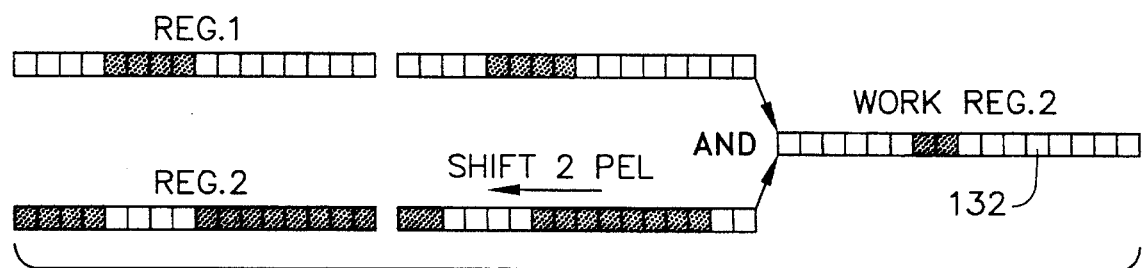
Figure 4C:
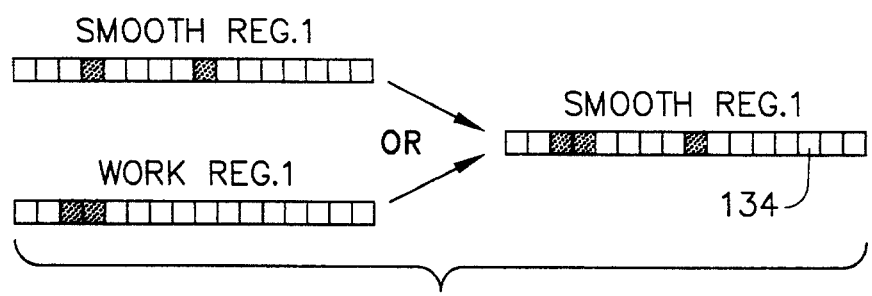
Figure 4D:
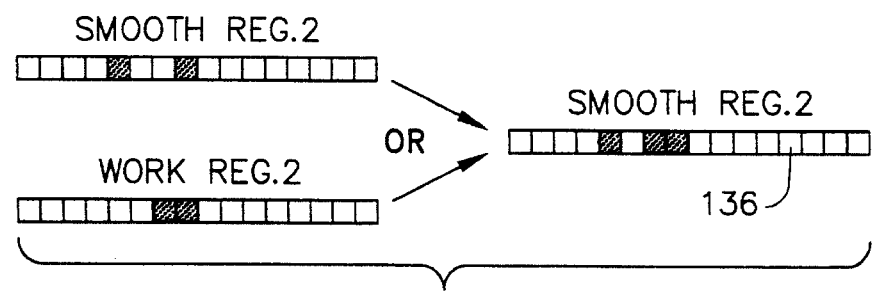

The next step of the present process is shown in FIG. 4A, in which the contents of REG.1 are shifted two pels to the left and AND-ed with REG.2, and the result is stored in WORK REG.1 (at index numeral 130). The next step, depicted in FIG. 4B, takes the contents of REG.2 and shifts them two pels to the left, AND's the result with the original contents of REG.1, and stores the result in WORK REG.2 (at index numeral 132). The next step, viewed in FIG. 4C, OR's the contents of SMOOTH REG.1 and WORK REG.1, and the result is placed in SMOOTH REG.1 (at index numeral 134). In FIG. 4D, the next step shows the contents of SMOOTH REG.2 being OR-ed to the contents of WORK REG.2, and the result is placed in SMOOTH REG.2 (at index numeral 136).

Figure 4E:
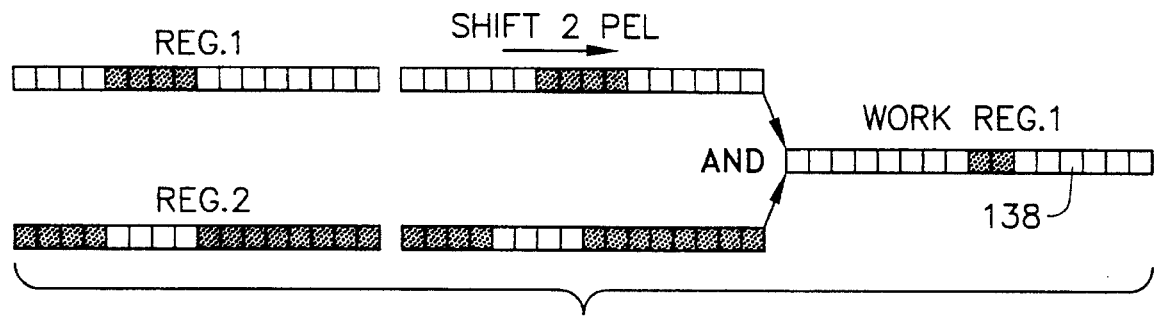
Figure 4F:
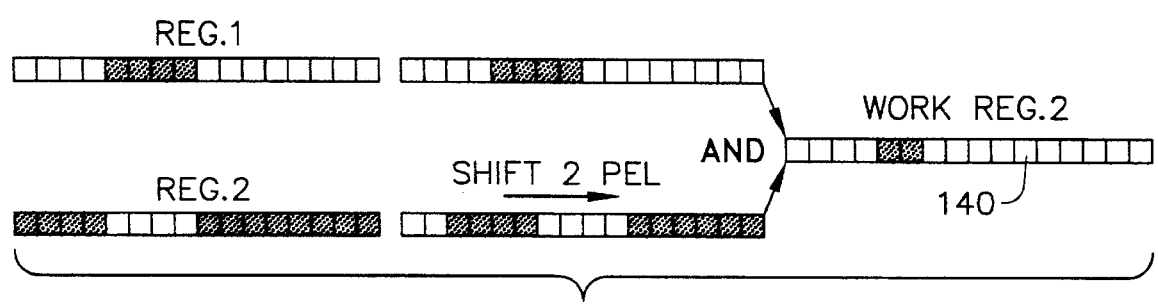
Figure 4G:
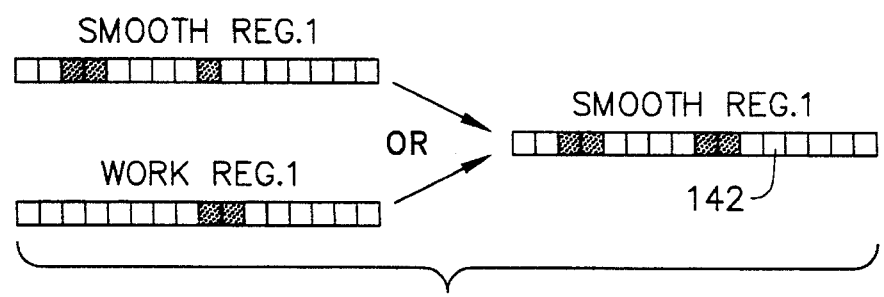
Figure 4H:
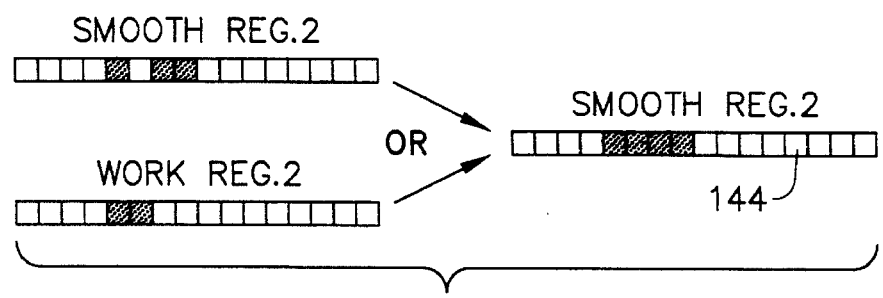

The next step, viewed in FIG. 4E, takes the contents of REG.1 and shifts them two pels to the right and AND-ed with REG.2, and the result is stored in WORK REG.1 (at index numeral 138). The next step takes the contents of REG.2 and shifts them two pels to the right, then AND's the result with the original contents of REG.1. The result is stored in WORK REG.2 (at index numeral 140) in FIG. 4F. SMOOTH REG.1 is now OR-ed with WORK REG.1, and the result stored in SMOOTH REG.1 (at index numeral 142) in FIG. 4G. SMOOTH REG.2 is now OR-ed with WORK REG.2, and the result is placed in SMOOTH REG.2 (at index numeral 144) in FIG. 4H.

The smooth registers are now in a condition to be used to change the bitmap, and SMOOTH REG.1 is OR-ed with row 3 of the bitmap 129 in its present state, after its initial OR-ing operation as shown in FIG. 3J. In the resulting bitmap, row 3 has the appearance as indicated at index numeral 146 on FIG. 4I. SMOOTH REG.2 is OR-ed with row 6 of bitmap 129, and the result appears on FIG. 4I as a new row 6 as indicated at the index numeral 148. The resulting bitmap is designated by the index numeral 150 for future reference.

Figure 5A:
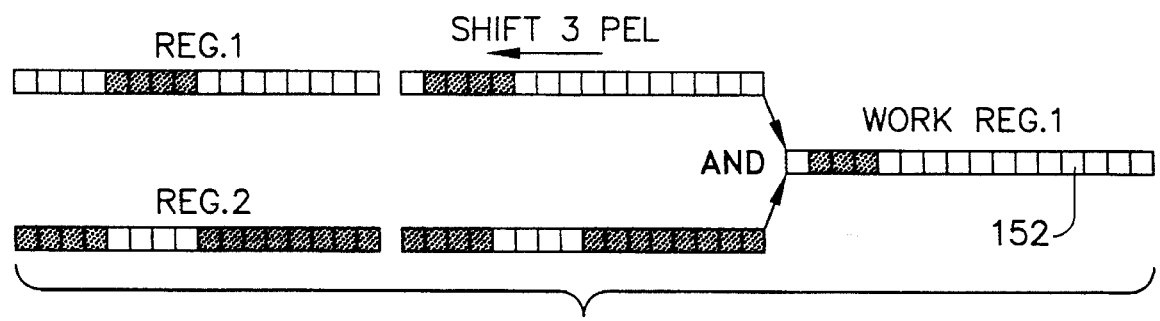
FIGS. 5A–5H are diagrams showing the logical data manipulations of the third pass through the Inner Loop to smooth the two-dimensional bitmap image of FIGS. 3A and 4I.
Figure 5B:
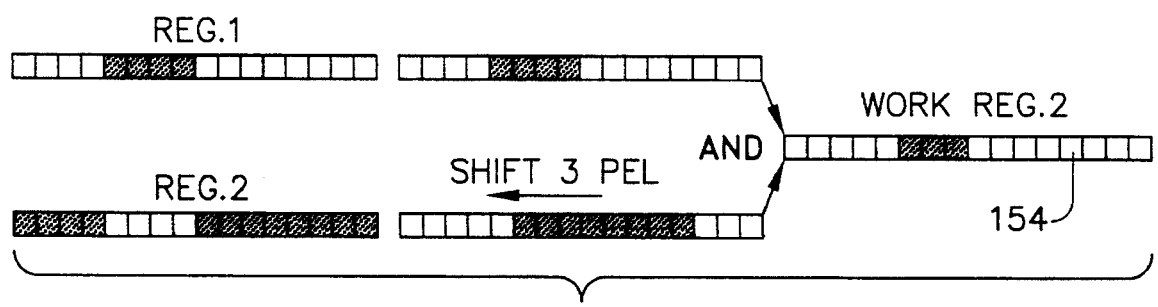
Figure 5C:
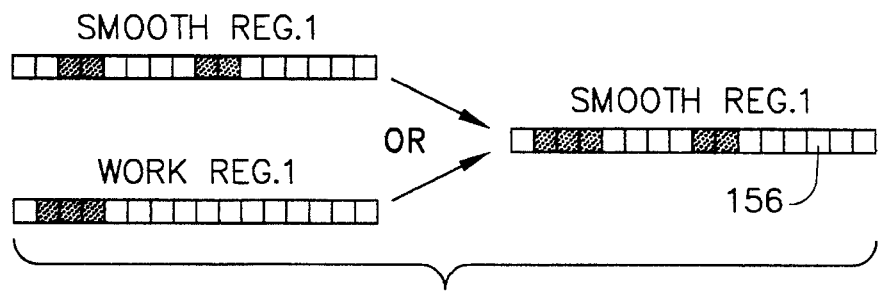
Figure 5D:
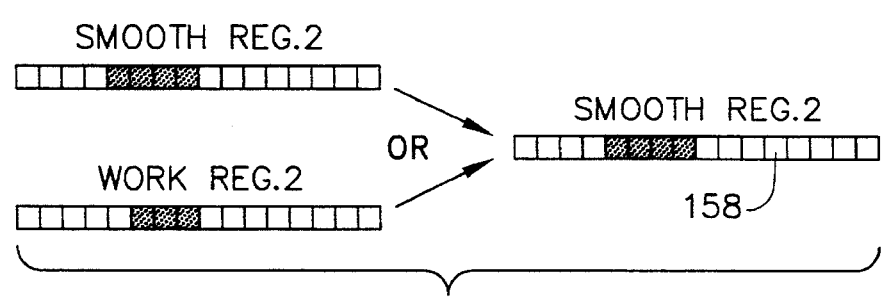

The next step in this process is to shift the contents of REG.1 three pels to the left, AND the result with REG.2, and place the result in WORK REG.1 (at the index numeral 152) as seen in FIG. 5A. The next step, viewed in FIG. 5B, takes the contents of REG.2 and shifts them three pels to the left, after which they are AND-ed with the original contents of REG.1, and the result is placed in WORK REG.2 (at the index numeral 154). At this time, SMOOTH REG.1 is OR-ed with WORK REG.1, and the result is placed into SMOOTH REG.1 (at the index numeral 156), as seen in FIG. 5C. The next step, viewed in FIG. 5D, is to OR SMOOTH REG.2 with WORK REG.2, then place the results into SMOOTH REG.2 (at the index numeral 158).

Figure 5E:
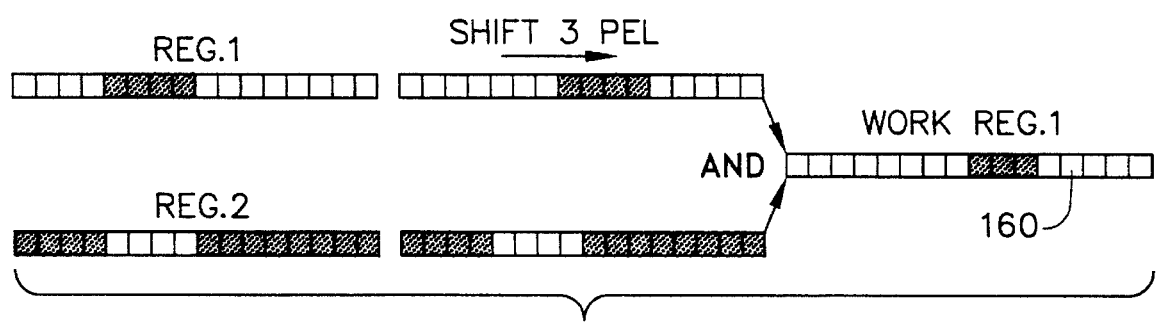
Figure 5F:
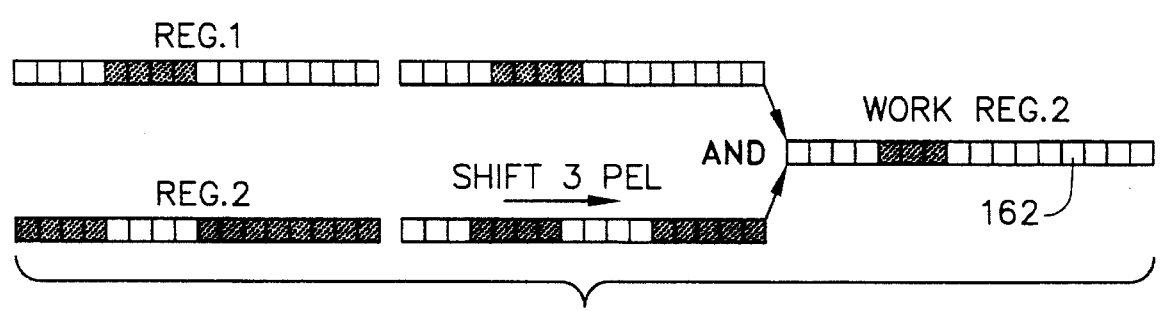
Figure 5G:
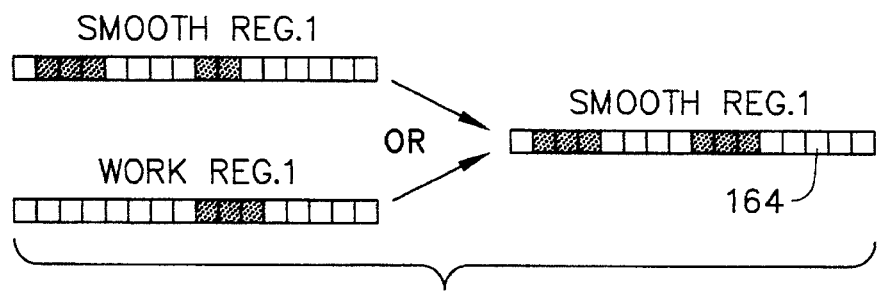
Figure 5H:
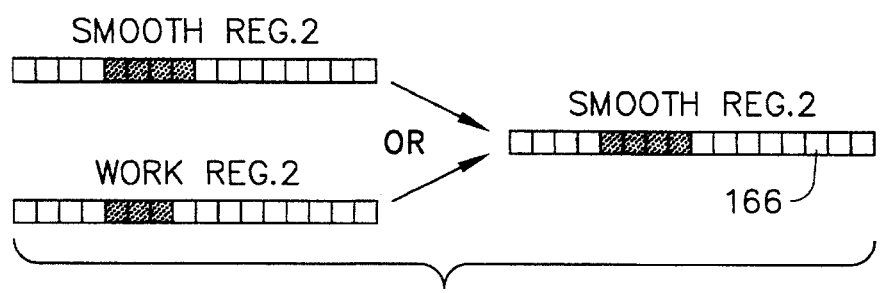

The next step takes the contents of REG.1 and shifts it three pels to the right, AND's the result with REG.2, and places the result into WORK REG.1 (at the index numeral 160) in FIG. 5E. In FIG. 5F, the next step is shown in which the contents of REG.2 are shifted three pels to the right, then AND-ed with original REG.1, and the result is placed into WORK REG.2 (at the index numeral 162). As viewed in FIG. 5G, SMOOTH REG.1 is now OR-ed with WORK REG.1, and the result placed into SMOOTH REG.1 (at the index numeral 164). The next step takes the contents of SMOOTH REG.2 and OR's it with WORK REG.2, and the result placed in SMOOTH REG.2 (at the index numeral 166) in FIG. 5H.

Figure 5I:
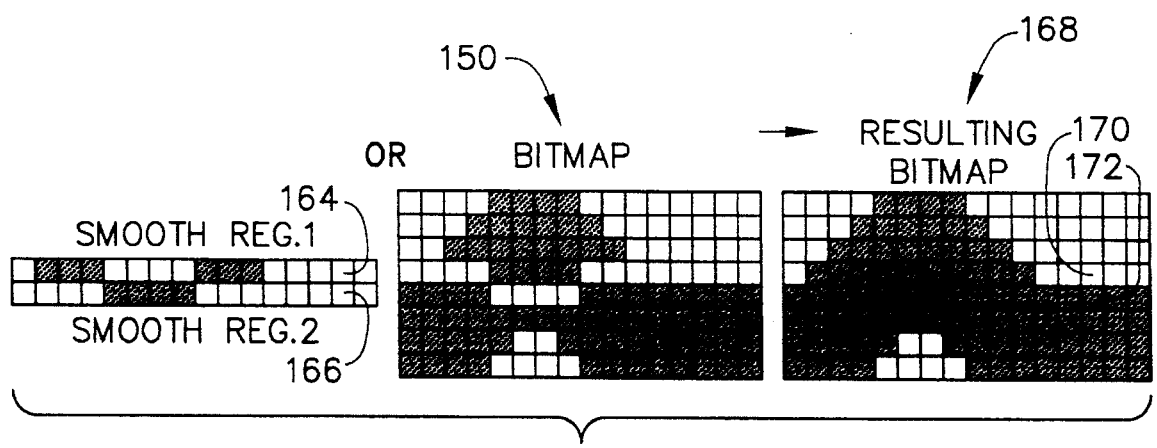
FIG. 5I is a two-dimensional representation of the 4× expanded, completely smoothed high-resolution bitmap image of FIG. 3A at the end of the third (and final) pass through the Inner Loop.

The smooth registers are now in the proper condition to be used to modify the present bitmap 150, as seen in FIG. 5I. SMOOTH REG.1 is OR-ed into row 4 of bitmap 150), and SMOOTH REG.2 is OR-ed with row 5 of the bitmap 150. The resulting bitmap, generally designated by the index numeral 168, is depicted having a new row 4 at the index numeral 170 and a new row 5 at the index numeral 172. The process has now been completed for smoothing the expanded, but jagged bitmap for a four times expansion along the original transition boundary 80 as viewed in FIG. 3A. As can be seen by comparing FIGS. 3A and 5I, the sharp transition between the original large, low resolution pels has been smoothed with a smaller staircase of 45 degree angle pels at the higher resolution. This takes advantage of the capabilities of a higher resolution laser printer, and the result can be rather dramatic, particularly when compared to a simple four times expansion that does not use a smoothing process.

Figure 6A:
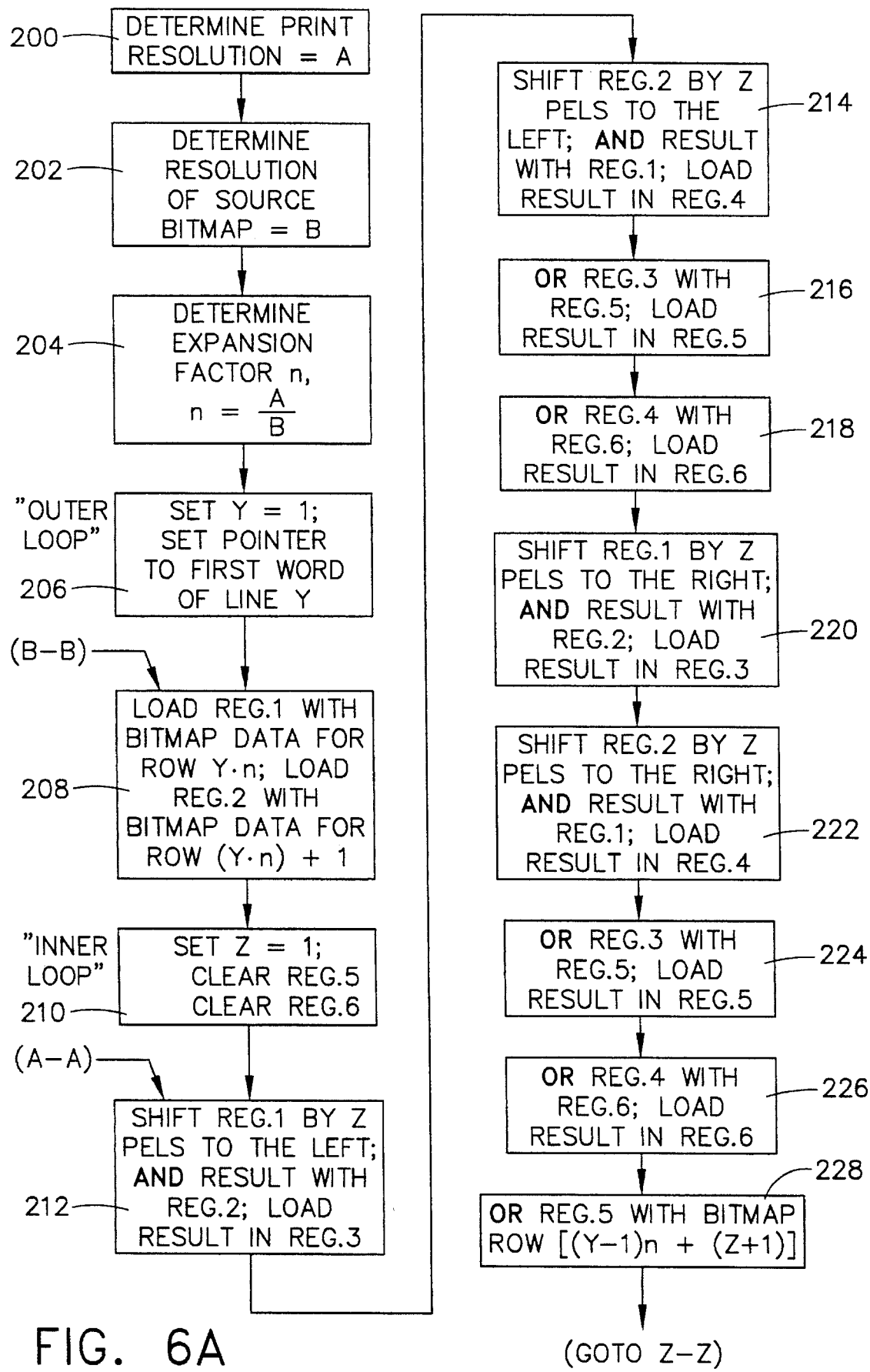
FIGS. 6A and 6B are a flow chart depicting the method steps to smooth an expanded bitmap according to the present invention.
Figure 6B:
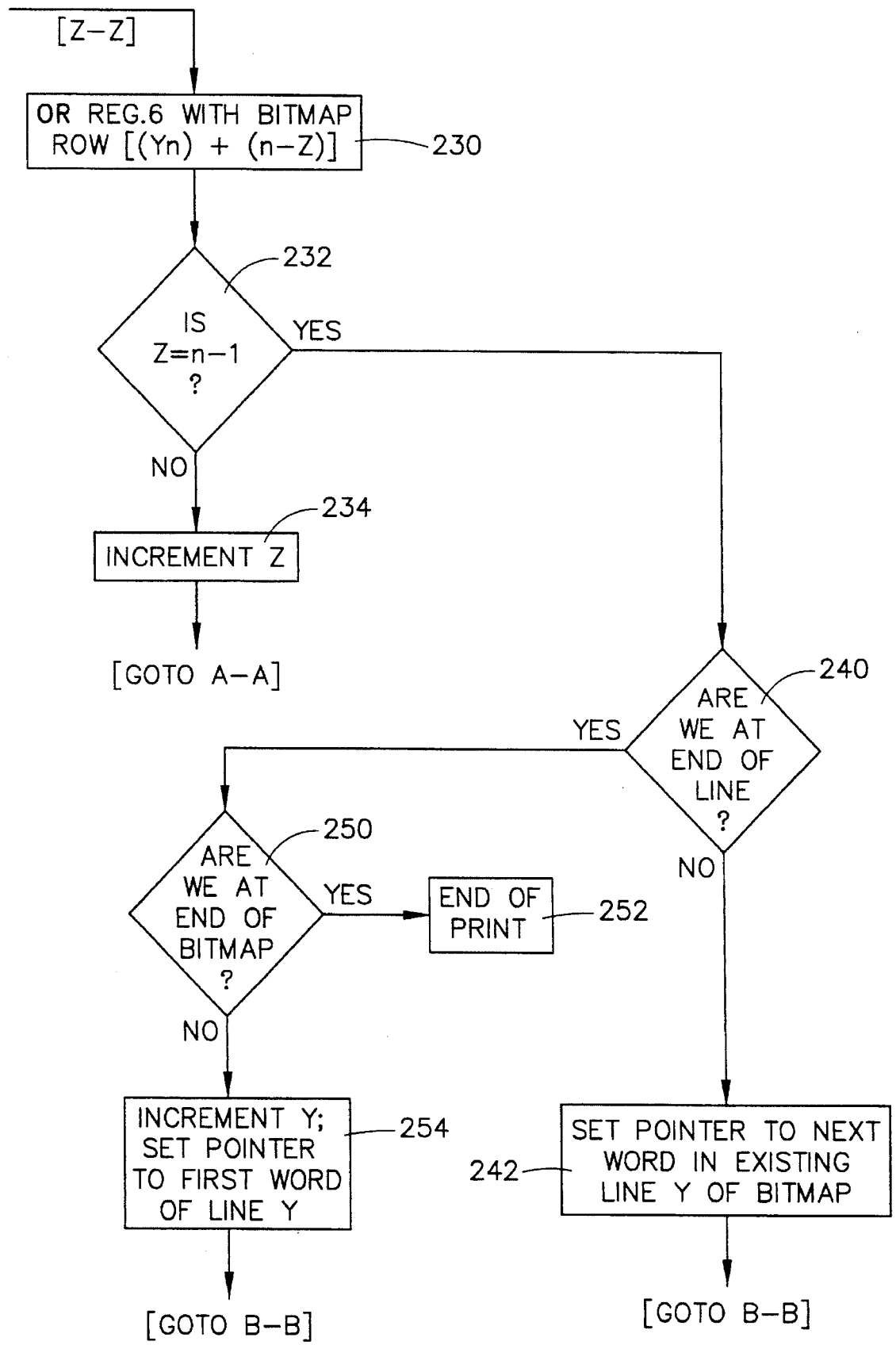

FIGS. 6A and 6B show a flow chart that describes the method steps of the present invention in great detail. It will be understood that these method steps typically take place during the execution of software commands in a microprocessor or a microcontroller, although for a very high-speed application, discrete logic could be used to implement the smoothing process for a bitmap expansion. In FIG. 6A, the initial function block, designated by the index numeral 200, determines the print resolution (in dpi) of the document to be printed by the laser printer. This print resolution is given the letter "A," and would normally be equal to the highest resolution that the laser printer is capable of.

The next step is to determine the resolution of the source bitmap, which typically would be a lower resolution such as 300 dpi or 150 dpi. This information can be gleaned from the data file that contains the original source bitmap, and its resolution is given the designation "B," and is determined in the function block 202 on FIG. 6A. Now that the values for both A and B are known, the expansion factor "n" can be determined at function block 204, which is simply the result of A divided by B, in which the result must be an integer value. If n is not equal to an integer value, the method of the present invention will not properly operate, because the individual rows and columns containing the higher resolution pels must be able to be operated on by logical, Boolean algebra equations.

The next function block, designated by the index numeral 206, in the flow chart of FIG. 6A is the beginning of the "Outer Loop" which will smooth the bits in all of the necessary rows of a bitmap along one particular transition boundary. In function block 206, a variable "Y" is set equal to 1, and a software pointer is set to the first word along line Y, which typically would be the left-hand 16 bits or 32 bits (depending upon the size of the accumulators or other operating registers of the microprocessor) along the uppermost row (i.e., row 1, since Y=1) of the entire bitmap. It should be noted that, for other passes through the Outer Loop, function block 206 will not be executed again, since either or both the values for Y and the pointer will be new.

In the next function block, designated by the index numeral 208, register #1 (REG.1) is loaded with bitmap data for the row Y times n (Yn), which, for a four times expansion, would be equal to row 4 (1×4), as seen in FIG. 3A at the index numeral 103. According to function block 208, register #2 (REG.2) will be loaded with bitmap data for the row [(Yn)+1], which would be row 5 in a four times expansion situation, as seen in FIG. 3A at index numeral 104. In essence, function block 208 is loading REG.1 and REG.2 with bitmap data along the first transition boundary (on FIG. 3A, transition boundary 80) during the first pass through the Outer Loop. During later passes through the Outer Loop, either the value of Y will have changed, or the pointer will be set to a second or later word along the original line Y.

The next function block, designated by index numeral 218, of the flow chart of FIG. 6A is the beginning of the "Inner Loop," and causes a new variable Z to be set equal to 1, and the two SMOOTH registers are cleared. On the flow chart of FIGS. 6A and 6B, SMOOTH REG.1 is denoted as REG.5, and SMOOTH REG.2 is denoted as REG.6. Furthermore, WORK REG.1 is also denoted as REG.3, and WORK REG.2 is denoted as REG.4. Function block 210 is an initialization procedure to clear REG.5 and REG.6, and to set Z=1.

In the next function block, designated by the index numeral 212, the contents of REG.1 are shifted by Z pels to the left, then AND-ed with the contents of REG.2. The result is loaded into REG.3. Function block 212 is equivalent to the operation that is depicted on FIG. 3B for the first pass through the Inner Loop, FIG. 4A for the second pass through the Inner Loop, and FIG. 5A for the third pass through the Inner Loop during a four-times bit expansion.

The next function block, designated by the index numeral 214, shifts the contents of REG.2 by Z pels to the left, and the result is AND-ed with the original contents of REG.1. The result of the AND-operation is loaded into REG.4. Function block 214 is equivalent to the operation as depicted in FIGS. 3C, 4B, and 5B for the three passes through the Inner Loop during a four-times bit expansion. It will be understood that the value for Z will be incremented as many times as necessary to operate upon all of the pertinent rows of a bitmap along a particular transition boundary to perform the proper expansion factor. The details of determining the values for the variable Z during each pass of the Inner Loop are described in detail hereinbelow.

The next function block, designated by the index numeral 216, performs an OR-operation on the contents of REG.3 and REG.5. During the first pass through the Inner Loop, REG.5 is cleared, as per function block 210. The result of this OR-operation is loaded into REG.5. Function block 216 is equivalent to the operations described in FIGS. 3D, 4C, and 5C during the various passes through the Inner Loop for a four-times bit expansion.

Function block 218 similarly performs an OR-operation on the contents of REG.4 and REG.6 (which is initially cleared as per function block 210), and the result is loaded into REG.6. This is equivalent to the operation as described in FIGS. 3E, 4D, and 5D.

The next function block, designated by the index numeral 220, shifts the contents of REG.1 by Z pels to the right. The result is AND-ed with the contents of REG.2, and the result of the AND-operation is loaded into REG.3. Function block 220 is equivalent to the operations as described in FIGS. 3F, 4E, and 5E.

In the next function block, designated by the index numeral 222, the contents of REG.2 are shifted by Z pels to the right, and the result is AND-ed with the initial contents of REG.1. The result of this AND-operation is loaded into REG.4. Function block 222 is equivalent to the operations as described in FIGS. 3G, 4F, and 5F, during the various passes through the Inner Loop for a four-times bit expansion.

In function block 224, the contents of REG.3 are OR-ed with the contents of REG.5, and the result is loaded in REG.5. This is equivalent to the operations as described in FIGS. 3H, 4G, and 5G during the various passes through the Inner Loop for a four-times bit expansion.

In function block 226, the contents of REG.4 and REG.6 are OR-ed, and the result is loaded into REG.6. Function block 226 is equivalent to the operations described in FIGS. 3I, 4H, and 5H during the various passes through the Inner Loop for a four-times bit expansion.

The two SMOOTH registers, REG.5 and REG.6, are now ready to be used in modifying the actual bitmap to create the smoothing effect. For each pass through the Inner Loop, REG.5 and REG.6 each are to be OR-ed with a particular row of the bitmap, and the respective bitmap rows to be operated on are determined during execution of function blocks 228 and 230. In function block 228, the contents of REG.5 (i.e., SMOOTH REG.1) are OR-ed with the bitmap row that is determined by the equation $[(Y-1)n+(Z+1)]$. During the first pass through the Inner Loop for a four times bit expansion, for example, the result of this equation would point to row 2, since Z=1, and the (Y−1) term cancels to 0. The result of this operation is shown in FIG. 3J in the resulting bitmap 129 at row 2, designated by the index numeral 126.

The logical flow follows the path (Z—Z) from FIG. 6A to FIG. 6B. In function block 230, the contents of REG.6 (i.e., SMOOTH REG.2), are OR-ed with the bitmap row that is determined by the equation $[(Yn)+(n-Z)]$. During the first pass through the Inner Loop for a four times bit expansion, for example, this equation points to row 7, since the values for Y and Z are both 1, and the value for n=4. During the first pass of the Inner Loop, the outcome of the execution of function block 230 is demonstrated on FIG. 3J by the resulting bitmap 129 at row 7, designated by the index numeral 128.

Figure 4I:
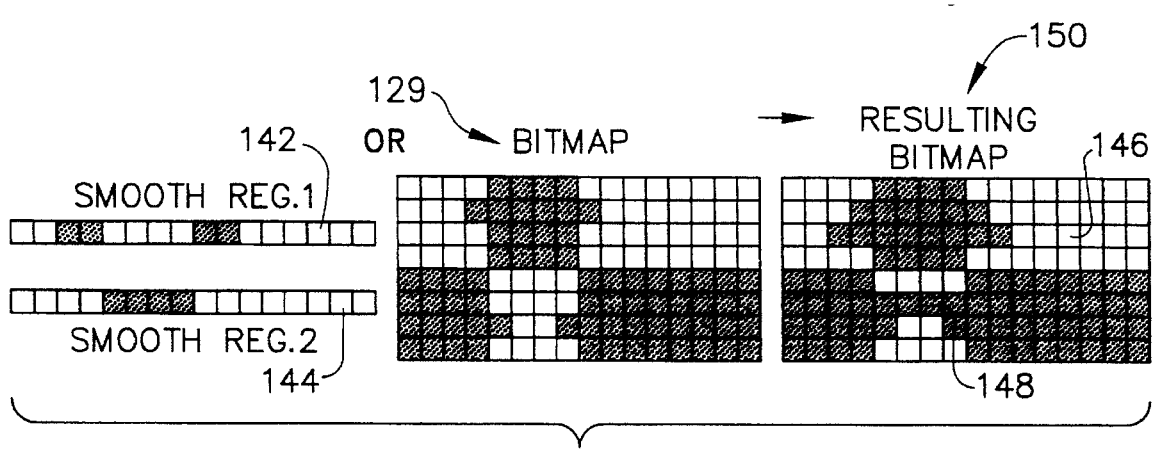
FIG. 4I is a two-dimensional representation of the 4× expanded, partially smoothed high-resolution bitmap image of FIG. 3A at the end of the second pass through the Inner Loop.

At this point in the flow chart of FIGS. 6A and 6B, the logical operations of the Inner Loop have been completed, and it now must be determined whether or not further passes through the Inner Loop must be performed; if so, Z will be incremented and the logical flow directed back to the beginning of the Inner Loop. Accordingly, decision block 232 determines if the present value of Z is now equal to the expansion factor n minus 1 (n−1), and if not, Z is incremented at function block 234. In the example provided in FIGS. 3A–3J, Z is equal to 1 and n equals 4, so another pass through the Inner Loop is required. At function block 234, Z is incremented to a value of 2, and the logical flow is directed back to function block 212 on FIG. 6A. At this time, the second pass through the Inner Loop will be performed according to the example provided in FIGS. 4A–4I. When the logical flow has reached function block 228, the contents of REG.5 will be OR-ed with the bitmap row 3, as shown in FIG. 4I by the resulting bitmap 150 and the row designated by the index numeral 146. Function block 230 will OR the contents of REG.6 with the bitmap row 6, as shown in FIG. 4I by the resulting bitmap 150 and the row designated by the index numeral 148.

In this four-times bit expansion example, decision block 232 will determine whether or not another pass through the Inner Loop needs to be performed, and since Z is now equal to 2, decision block 232 will be answered with the result NO, Z will again be incremented at function block 234, and the logical flow will be directed back to function block 212 for a third pass through the Inner Loop. The example provided by FIGS. 5A–5I show the workings of the Inner Loop during its third pass, and when function block 228 is reached, the contents of REG.5 are OR-ed with row 4 of the resulting bitmap 156, as shown in FIG. 5I by the row designated by the index numeral 152. At function block 230, the contents of REG.6 are OR-ed with bitmap row 5 of the resulting bitmap 156, as shown in FIG. 5I by the row designated by the index numeral 154.

In the above four-times bit expansion example, after three passes through the Inner Loop, decision block 232 will find that Z (now having a value of 3) is now equal to (n−1), so the logical flow will be directed through the YES output to another decision block 240 on FIG. 6B. Since only one word of data is typically operated upon at any time by the microprocessor, each set of rows at the transition boundary 80 must be operated upon several times (i.e., one word at a time when using a sequential microprocessor system) to create the smoothing effect throughout all of the columns in the pertinent rows. Since a typical laser print-out will be a piece of paper having several inches of width (e.g., an eight-inch wide page), there will be several thousand columns of pels associated with any pair of rows along a transition boundary. Therefore, each word of data (having only 16 bits, for example) must be operated upon, one at a time for a sequential processing unit, until we are at the end of the line.

Decision block 240 determines whether or not the word presently being operated upon is at the end of the pertinent line, and if not, the logical flow is directed through the NO output to a function block 242 that commands the microprocessor system to set the pointer to the next word (with some overlap—see below for details) in the existing line Y of the bitmap. After that occurs, the logical flow is directed to function block 208 on FIG. 6A, which essentially begins a new Outer Loop. If this is only the second pass through the Outer Loop, the value of Y will still be equal to 1, and the rows to be operated upon will still be along the first transition boundary (e.g., for a four-times bit expansion, rows 4 and 5 will be loaded, respectively into REG.1 and REG.2).

If the word size is 16 bits, the actual pels to be loaded into REG.1 and REG.2 will be the pels numbered 13–28, inclusive, from the left-hand border of the page. The 4-bit overlap is desired so the boundary between the pels at columns 12 and 13 can be evaluated according to the present invention. Once that has been accomplished, the Inner Loop will be executed according to the flow chart steps depicted in FIGS. 6A and 6B. During a four-times bit expansion procedure, the first pass through the Inner Loop will be similar to the example provided in FIGS. 3A–3J, the second pass will be according to the example of FIGS. 4A–4I, and the third pass will be according to the example provided in FIGS. 5A–5I.

After multiple passes through the Outer Loop, decision block 240 will finally determine that the end of the line has been reached, and the logical flow will be directed along its YES output to decision block 250. Decision block 250 will determine whether the end of the bitmap has been reached, and if so, the logical flow will be directed through the YES output to function block 252 which is the end of the print-out for a particular page (assuming the bitmap is for one entire page). If decision block 250 is answered NO, the logical flow will be directed to a function block 254, which increments the value for Y. In addition, function block 254 sets the pointer to the first word of line Y, typically meaning the first word-sized set of pels that are located at the left-hand side of line Y. If the word size is 16 bits, then the first left-hand 16 pels of the pertinent rows will be loaded into REG.1 and REG.2, according to function block 208 on FIG. 6A.

At this time, the logical flow has arrived at a new transition boundary, e.g., the transition boundary between rows 8 and 9 on FIG. 2E. The equations in function block 208 determine precisely which rows are to be operated on, and in the example where Y has been incremented to the value 2 in a four-times bit expansion, this will be directed to rows 8 and 9. If the value of Y has been incremented to 3, then rows 12 and 13 will be operated upon in a four-times bit expansion procedure. It will be understood that the equations provided in the flow chart of FIGS. 6A and 6B are universal for any bit expansion factor (i.e., as long as that expansion factor is an integer value), and will work with any word size or any bitmap size, without departing from the principles of the present invention.

Figure 7A:
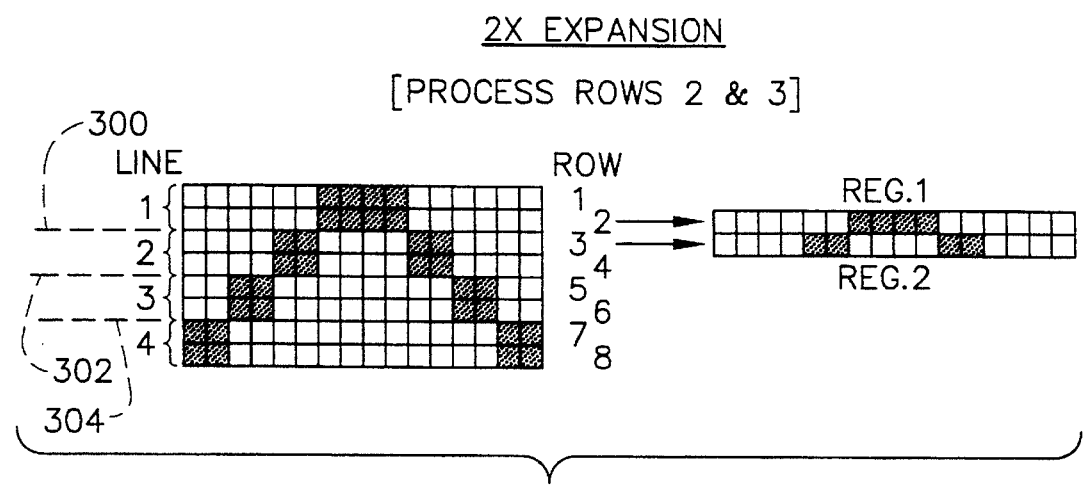
FIG. 7A is a two-dimensional representation of a 2× expanded, unsmoothed high-resolution bitmap image at the beginning of a smoothing procedure.

A two-times bit expansion example is provided in FIGS. 7A–7J, 8A–8J, and 9A–9J. In FIG. 7A, the original low-resolution bitmap is depicted after having already been expanded by a factor of two, however, without any smoothing effect applied. The expansion factor n is equal to the value 2, and for the first pass through the Outer Loop (i.e., where Y=1, as per function block 206), the transition boundary depicted by index numeral 300 will be evaluated, and rows 2 and 3 will be, respectively, loaded into REG.1 and REG.2.

Figure 7B:
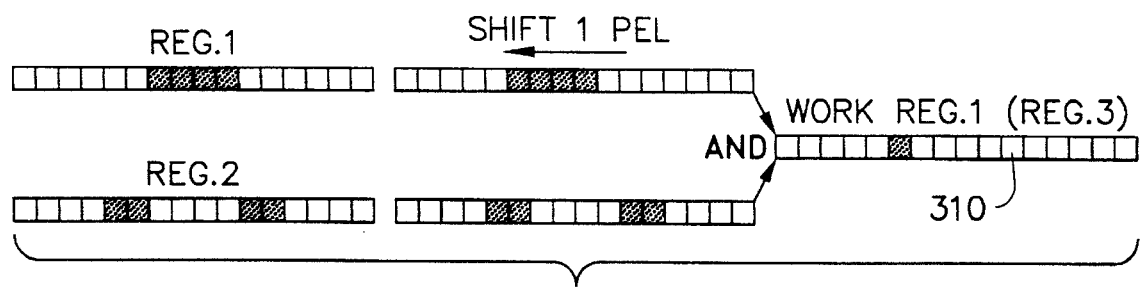
FIGS. 7B–7I are diagrams showing the logical data manipulations of the first pass through the Outer Loop (which includes one Inner Loop) to smooth the two-dimensional bitmap image of FIG. 7A.
Figure 7C:
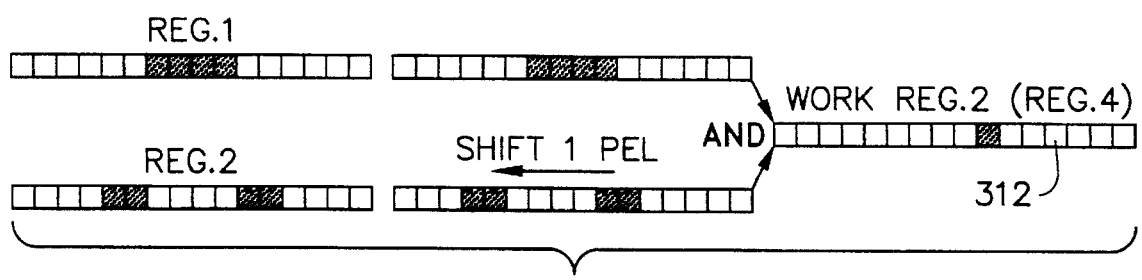

As depicted FIG. 7B, REG.1 is shifted one pel to the left and AND-ed with REG.2, and the result loaded into WORK REG.1, at the index numeral 310. In FIG. 7C, REG.2 is shifted one pel to the left and AND-ed with REG.1, and the result loaded into WORK REG.2, at the index numeral 312. These operations are respectively, equivalent to function blocks 212 and 214 on the flow chart of FIG. 6A.

Figure 7D:
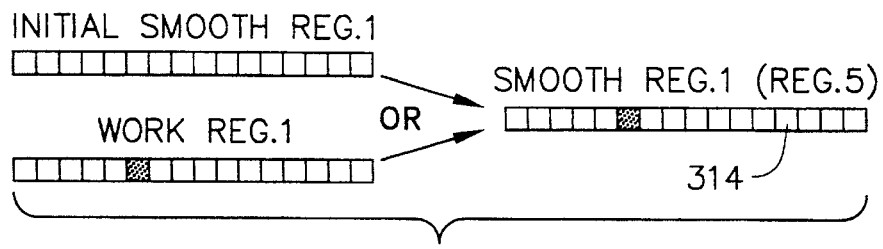
Figure 7E:
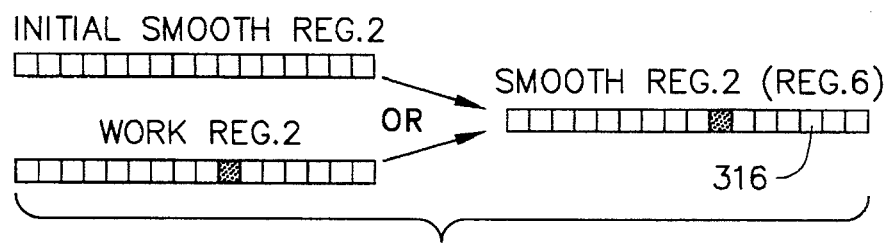

In FIG. 7D, the initially cleared SMOOTH REG.1 is OR-ed with WORK REG.1, and the result loaded into SMOOTH REG.1 (also known as REG.5), at the index numeral 314. In FIG. 7E, the initially cleared SMOOTH REG.2 is OR-ed with WORK REG.2, and the result loaded into SMOOTH REG.2 (also known REG.6), at index numeral 316. These operations are respectively equivalent to function blocks 216 and 218 on the flow chart of FIG. 6A.

Figure 7F:
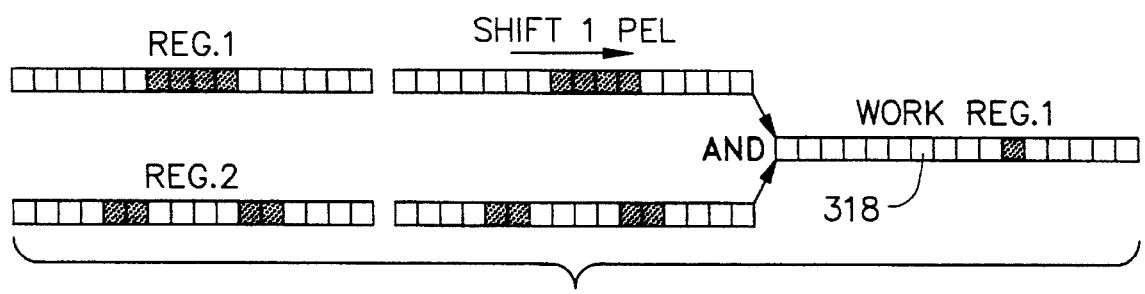
Figure 7G:
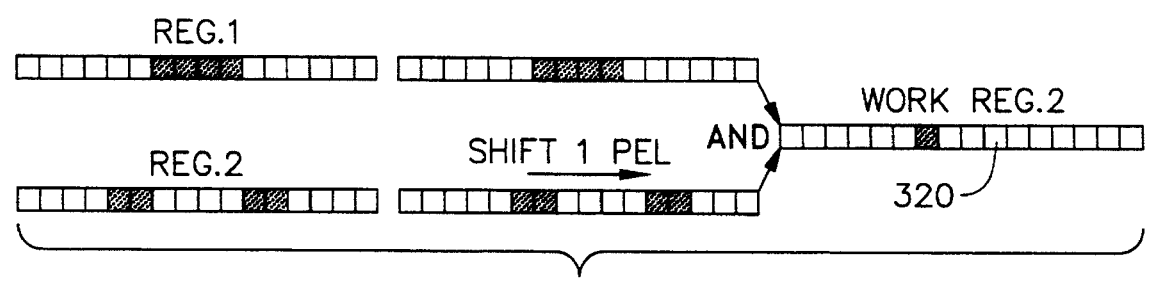

In FIG. 7F, REG.1 is shifted one pel to the right and AND-ed with REG.2, with the result loaded into WORK REG.1 at index numeral 318. In FIG. 7G, the contents of REG.2 are shifted one pel to the right and AND-ed with REG.1, with result loaded into WORK REG.2 at index numeral 320. These operations are respectively equivalent to function blocks 220 and 222 on the flow chart of FIG. 6A.

Figure 7H:
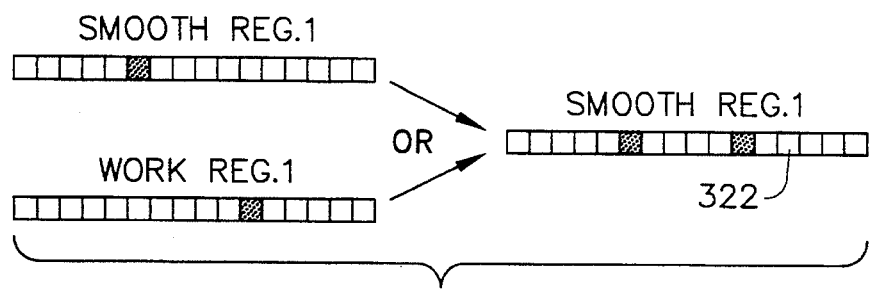
Figure 7I:
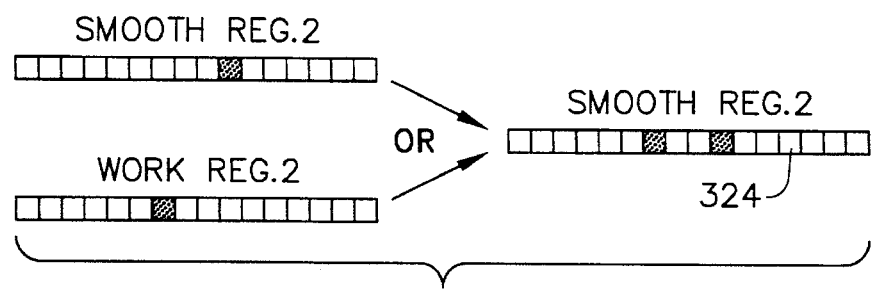

In FIG. 7H, SMOOTH REG.1 is OR-ed with WORK REG.1 and the result loaded into SMOOTH REG.1 at index numeral 322. In FIG. 7I, SMOOTH REG.2 is OR-ed with WORK REG.2 and the result loaded into SMOOTH REG.2 at the index numeral 324. These operations are respectively equivalent to function blocks 224 and 226 on the flow chart of FIG. 6A.

Figure 7J:
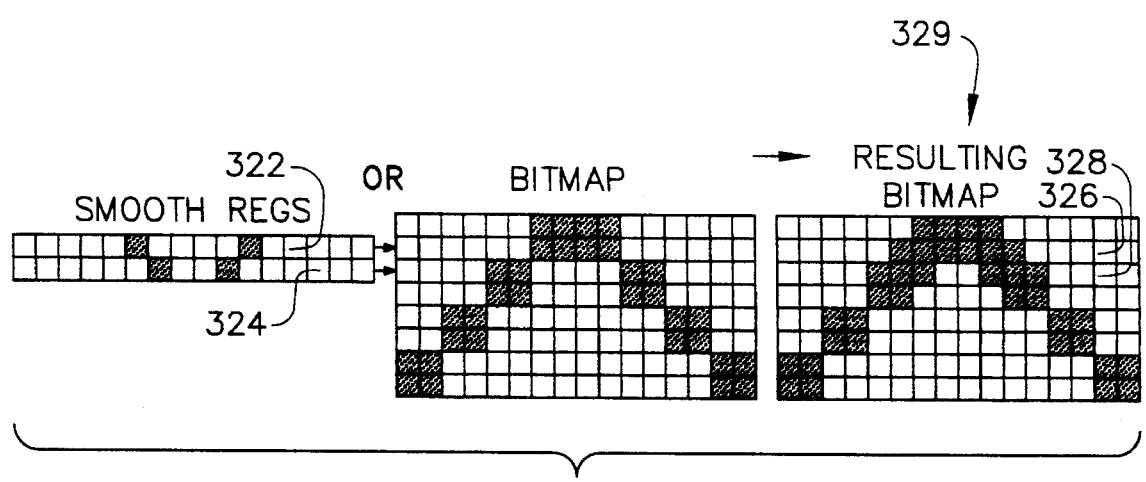
FIG. 7J is a two-dimensional representation of the 2× expanded, partially smoothed high-resolution bitmap image of FIG. 7A at the end of the first pass through the Outer Loop.

On FIG. 7J, the results of the SMOOTH registers at the end of the first pass through the Inner Loop are respectively OR-ed with rows 2 and 3 of the original bitmap from FIG. 7A, thereby providing a resulting bitmap designated by the index numeral 329, having newly smoothed rows 2 and 3, respectively designated by the index numerals 326 and 328.

Since the example of FIGS. 7A–7J are for a two-times bit expansion, only one pass through the Inner Loop is required per each transition boundary (e.g., transition boundary 300), and decision block 232 of the flow chart on FIG. 6B will be answered with a YES result every time, essentially requiring only one pass through the Inner Loop per each Outer Loop. Once the end of a line has been achieved, as determined by decision block 240, the value for Y will be incremented, and the pels along the second transition boundary 302 will be manipulated accordingly to create the smoothing effect of the present invention.

It will be understood that the order of execution of operating on any particular bits or pels for a particular set of words can vary without departing from the principles of the present invention. It is preferred that the pels of an entire set of rows along one transition boundary be evaluated all the way across the page of a particular bitmap before incrementing to words in the second or any later group of rows along a second or later transition boundary. Of course, all of the pels in a particular group of columns could be evaluated instead by incrementing the value for Y and evaluating all of the words along the left-hand margin of the bitmap before shifting to the next word (to the right) in any of the particular lines or rows. Naturally, it is preferred that regardless of the indexing scheme used, all of the words in a particular bitmap be evaluated to determine whether or not a smoothing operation is necessary along all of the transition boundaries.

Figure 8A:
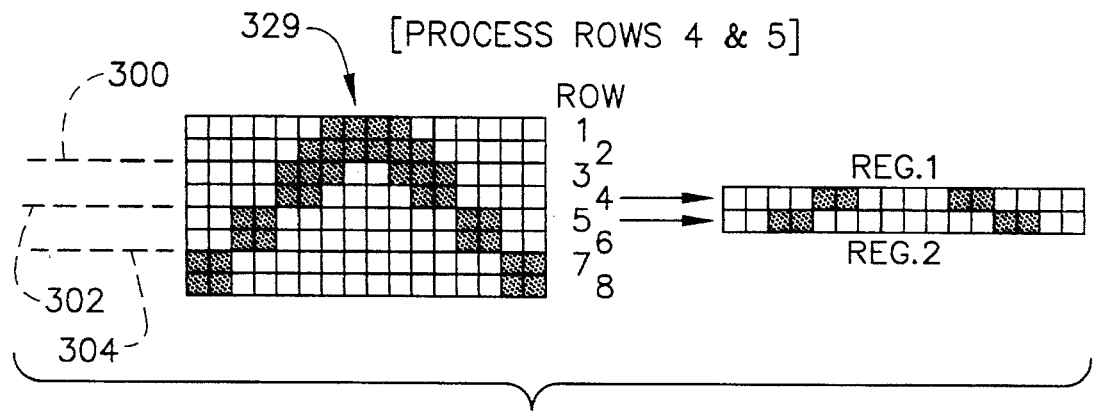
FIG. 8A is a two-dimensional representation of the 2× expanded, partially smoothed high-resolution bitmap image of FIGS. 7A and 7J at the beginning of the second pass through the Outer Loop.
Figure 8B:
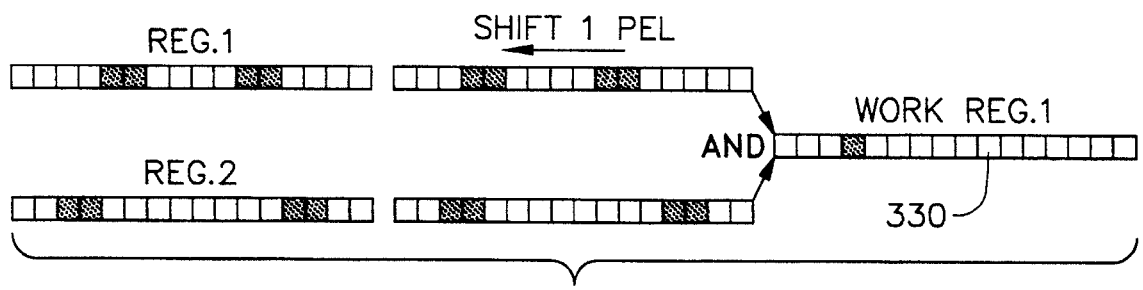
FIGS. 8B–8I are diagrams showing the logical data manipulations of the second pass through the Outer Loop (which includes one Inner Loop) to smooth the two-dimensional bitmap image of FIGS. 7A and 8A.
Figure 8C:
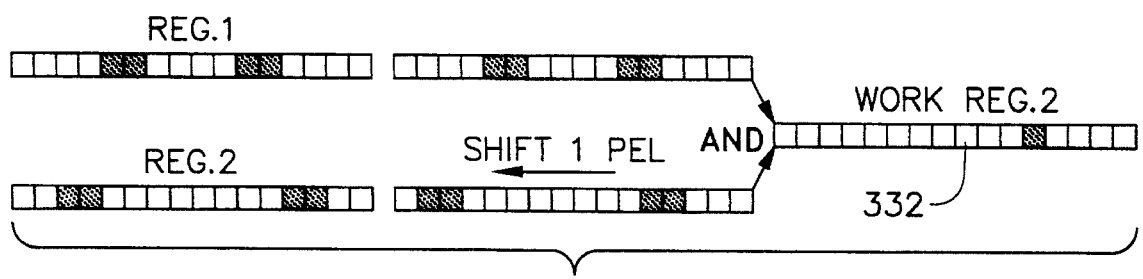

FIG. 8A depicts the beginning of the Outer Loop when Y has been set to the value of 2, thereby evaluating the pels along the transition boundary 302. According to function block 208 on the flow chart of FIG. 6A, REG.1 and REG.2 are loaded respectively with data from rows 4 and 5. The Inner Loop is now executed, and in FIGS. 8B and 8C, REG.1 and REG.2 are shifted one pel to the left then AND-ed with their opposite registers, with the results loaded respectively into WORK REG.1 and WORK REG.2, at index numerals 330 and 332, reflecting the operations of function blocks 212 and 214 on the flow chaff of FIG. 6A.

Figure 8D:
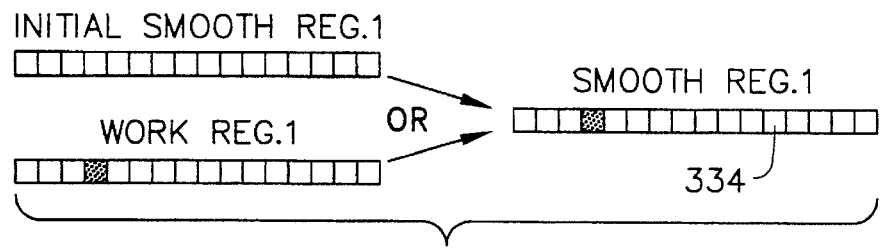
Figure 8E:
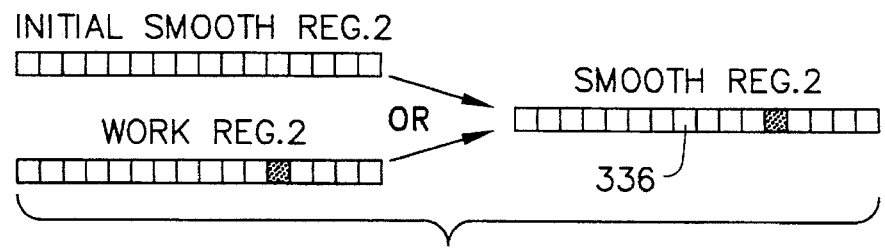

In FIGS. 8D and 8E, the initially cleared SMOOTH registers are respectively OR-ed with WORK REG.1 and WORK REG.2, and the results loaded into SMOOTH REG.1 and SMOOTH REG.2 at index numerals 334 and 336, respectively. These operations are according to function blocks 216 and 218 on the flow chart of FIG. 6A.

Figure 8F:
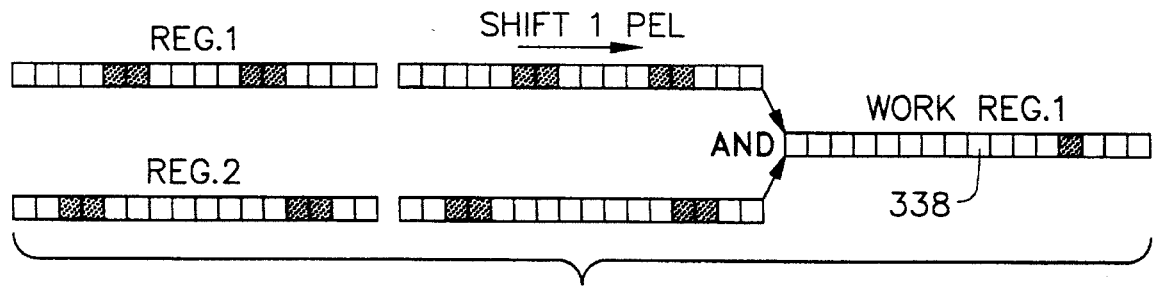
Figure 8G:
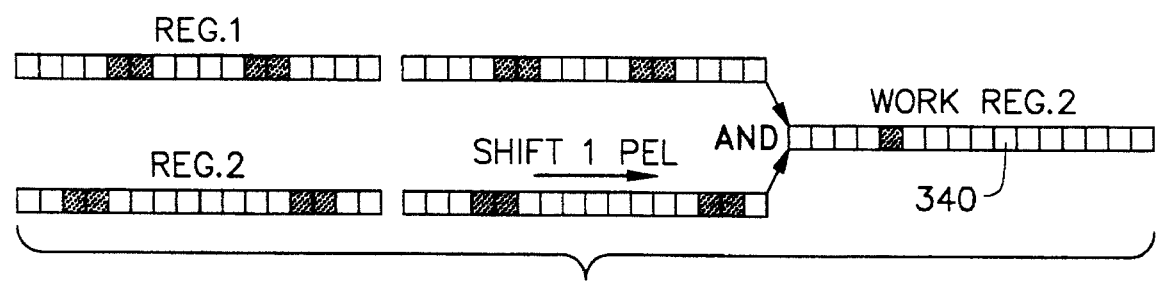
Figure 8H:
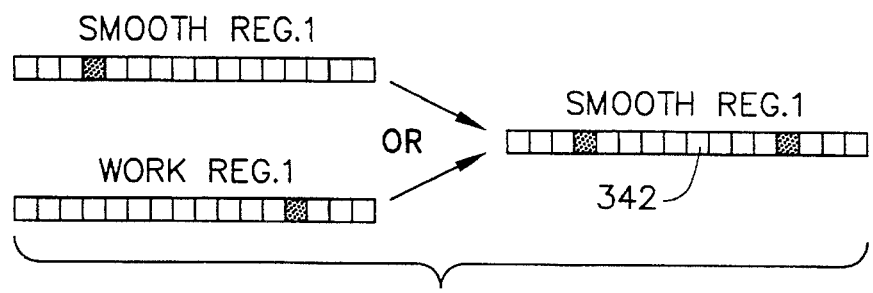
Figure 8I:
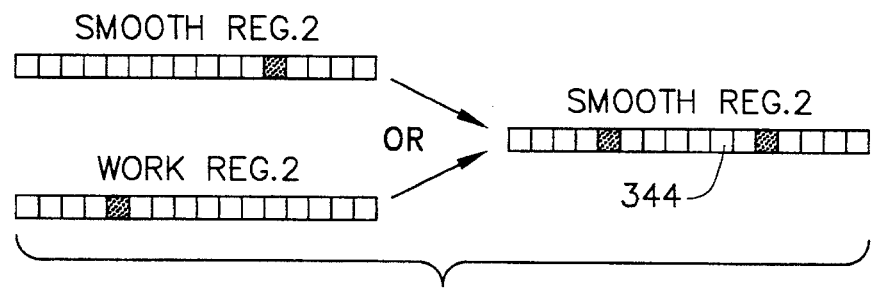
Figure 8J:
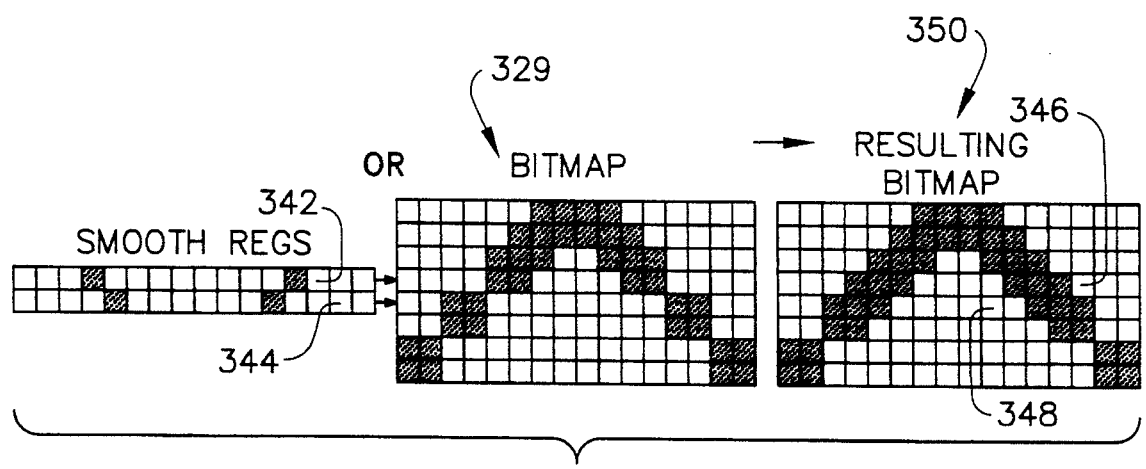
FIG. 8J is a two-dimensional representation of the 2× expanded, partially smoothed high-resolution bitmap image of FIG. 8A at the end of the second pass through Outer Loop.

FIGS. 8F and 8G depict the operations where REG.1 and REG.2 are each shifted one pel to the right then AND-ed with their opposite registers, and the results loaded into WORK REG.1 and WORK REG.2 at index numerals 338 and 340, respectively. In FIGS. 8H and 8I, the SMOOTH registers are OR-ed with their respective WORK registers, with the results being placed in SMOOTH REG.1 and SMOOTH REG.2, at the index numerals 342 and 344, respectively. The operations depicted in FIGS. 8F–8I are according to function blocks 220, 222, 224, and 226 on the flow chart of FIG. 6A.

The SMOOTH registers are now in condition for being OR-ed with the bitmap 329 from FIG. 7J. Since this is the second pass through the Outer Loop, function block 228 is evaluated, thereby directing the OR-operation of SMOOTH REG.1 into row 4, and function block 230 on FIG. 6B indicates that SMOOTH REG.2 should be OR-ed with row 5. This provides a resulting bitmap designated by the index numeral 350, having a smoothed row 4 at index numeral 346 and a smoothed row 5 at index numeral 348.

Figure 9A:
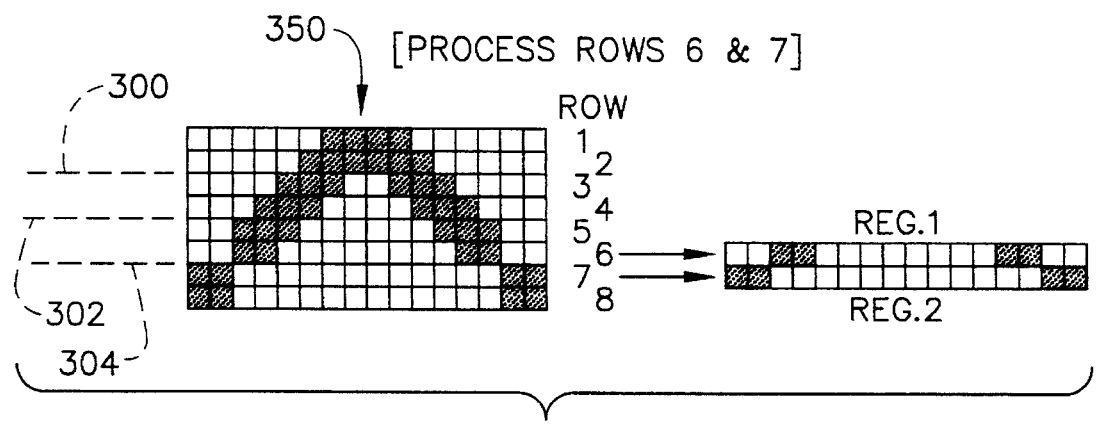
FIG. 9A is a two-dimensional representation of the 2× expanded, partially smoothed high-resolution bitmap image of FIGS. 7A and 8J at the beginning of the third pass through the Outer Loop.
Figure 9B:
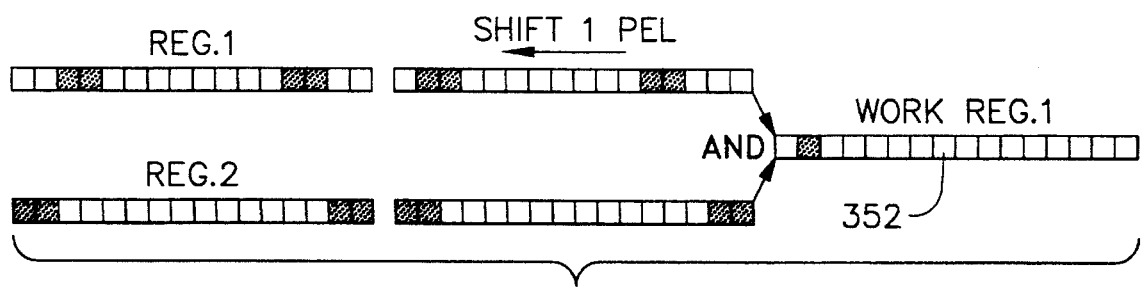
FIGS. 9B–9I are diagrams showing the logical data manipulations of the third pass through the Outer Loop (which includes one Inner Loop) to smooth the two-dimensional bitmap image of FIGS. 7A and 9A.
Figure 9C:
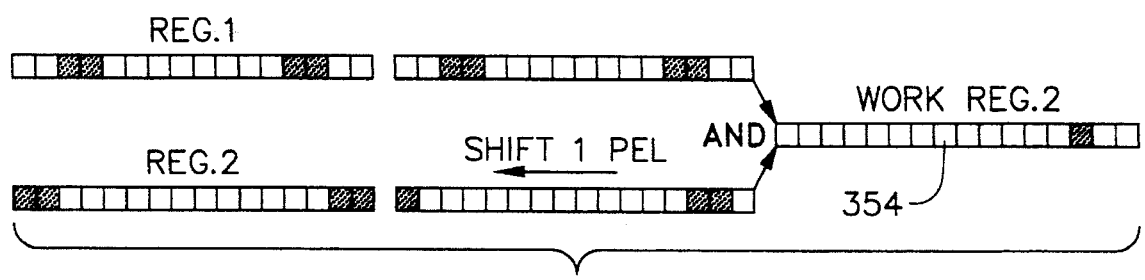
Figure 9D:
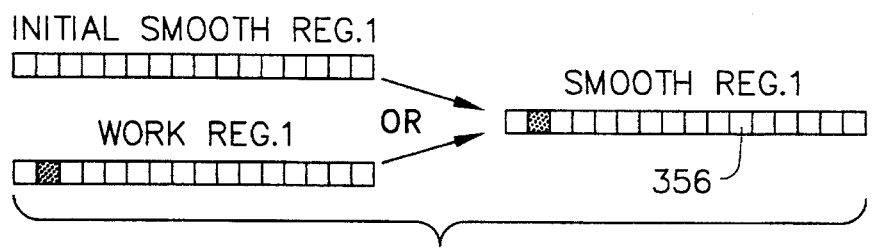
Figure 9E:
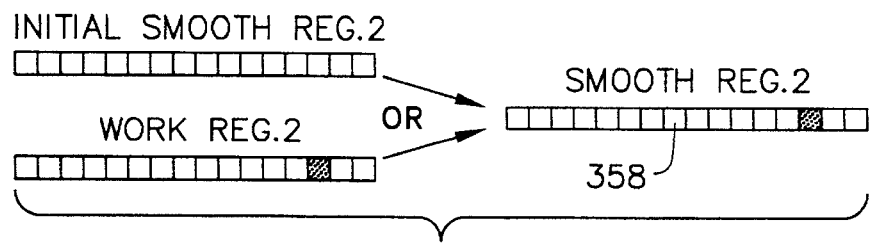

After the end of this line has been reached, as determined by decision block 240 on the flow chart of FIG. 6B, the value for Y is incremented again, and the Outer Loop is executed again, starting at function block 208 on the flow chart of FIG. 6A. Since Y is now equal to the value of 3, rows 6 and 7 of the resulting bitmap 350 are now respectively loaded into REG.1 and REG.2, according to function block 208. The Inner Loop is now executed, and in FIGS. 9B and 9C, REG.1 and REG.2 are both shifted one pel to the left and AND-ed with their opposite registers, with results loaded into WORK REG.1 and WORK REG.2 at index numerals 352 and 354, respectively. In FIGS. 9D and 9E, the initially cleared SMOOTH registers are OR-ed with their respective WORK registers, and the results placed in SMOOTH REG.1 and SMOOTH REG.2, at index numerals 356 and 358, respectively. These operations are executed according to function blocks 212, 214, 216, and 218 on the flow chart of FIG. 6A.

Figure 9F:
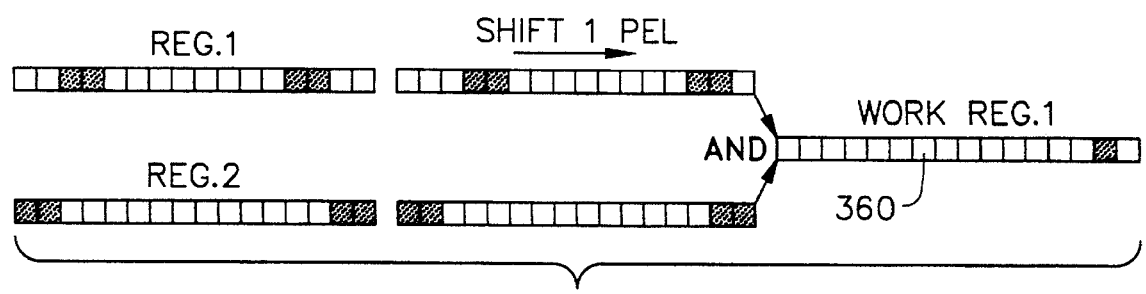
Figure 9G:
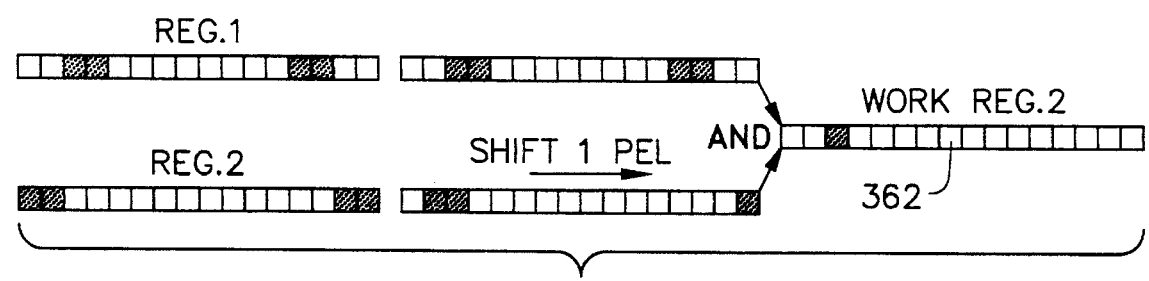
Figure 9H:
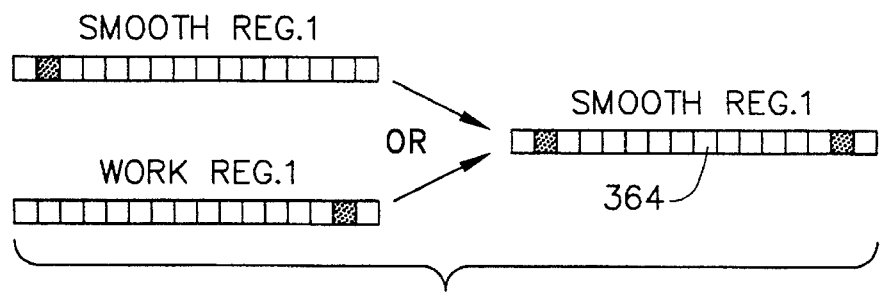
Figure 9I:
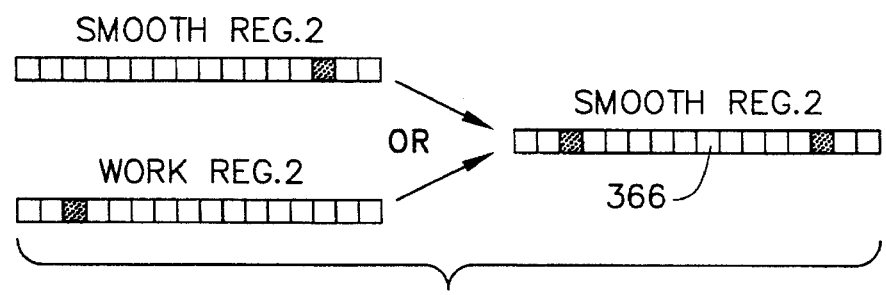
Figure 9J:
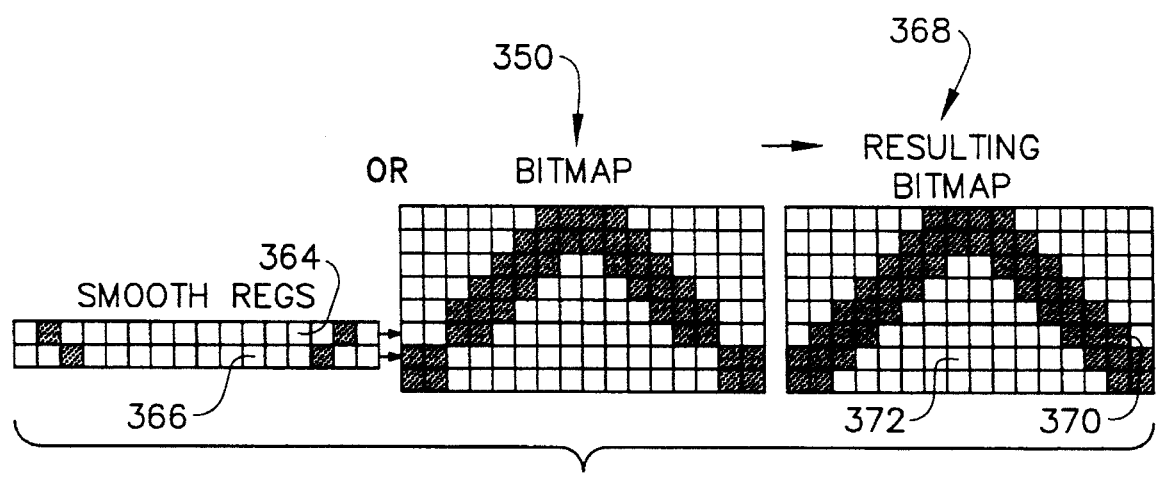
FIG. 9J is a two-dimensional representation of the 2× expanded, completely smoothed high-resolution bitmap image of FIG. 9A at the end of the third (and final) pass through the Outer Loop.

Registers #1 and #2 are now shifted one pel to the right, as according to FIGS. 9F and 9G, then AND-ed with their opposite registers with the results placed in WORK REG.1 and WORK REG.2 at index numerals 360 and 362, respectively. The SMOOTH registers are now OR-ed with their respective WORK registers according to FIGS. 9H and 91, with the results being placed into SMOOTH REG.1 and SMOOTH REG.2 at index numerals 364 and 366, respectively. These operations are executed according to function blocks 220, 222, 224, and 226 on the flow chart of FIG. 6A.

The SMOOTH registers are now in condition for being OR-ed with the respective rows of the bitmap 350. Since Y=3, SMOOTH REG.1 is OR-ed with row 6, providing a smoothed row 6 at the index numeral 370 on the resulting bitmap 368. SMOOTH REG.2 is OR-ed with row 7, providing a smoothed row 7 at index numeral 372 on the resulting bitmap 368. It will be understand that the example provided in FIGS. 7A–7J, 8A–8J, and 9A–9J are illustrative of the operations required for only a small section of a much larger bitmap. Furthermore, as related above, it will be understood that the order that the various rows and words (i.e., columns) are operated on by the method of the present invention can easily be altered without departing from the principles of the present invention.

Figure 10A:
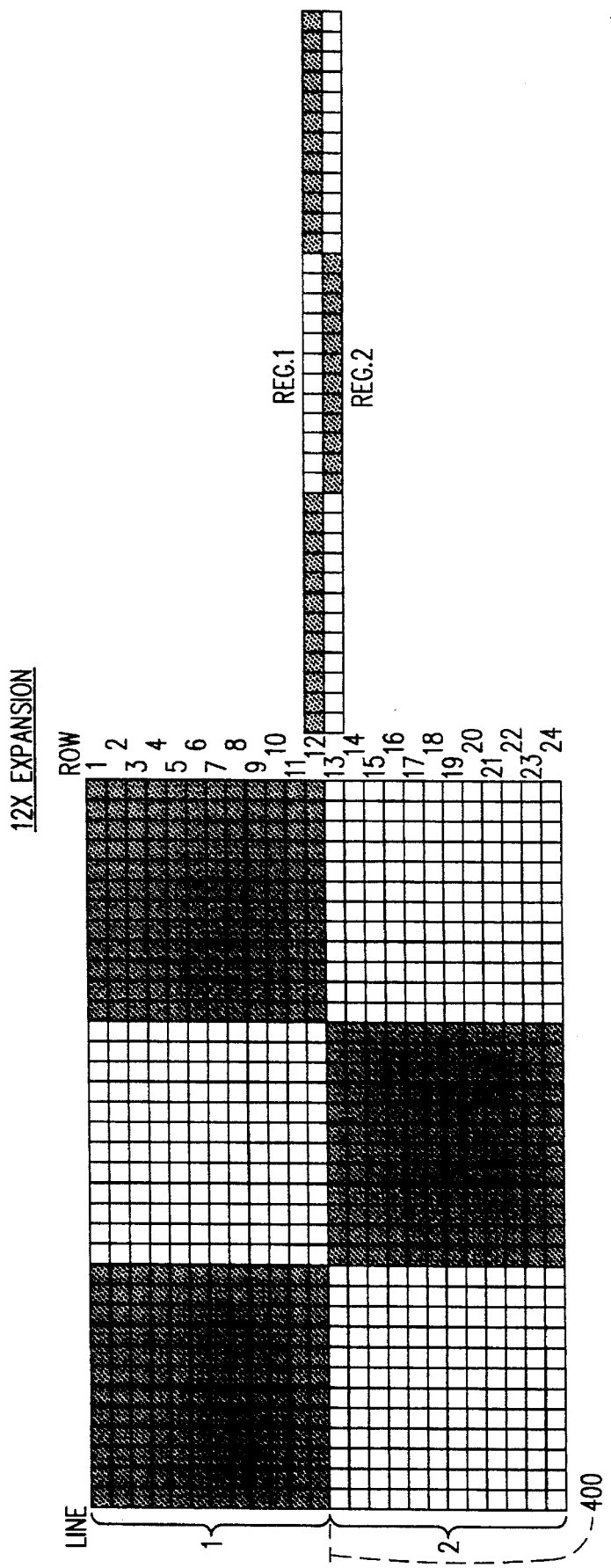
FIG. 10A is a two-dimensional representation of a 12× expanded, unsmooth high-resolution bitmap image at the beginning of a smoothing procedure.

A 12-times bit expansion example is provided starting on FIG. 10A for illustrative purposes. Such an expansion could occur when the source bitmap has a resolution of only 100 dots per inch (dpi) and the bitmap is to be printed on a laser printer having an output resolution of 1200 dpi. As can be seen on FIG. 10A, each line of the source bitmap will be divided into 12 rows at the higher resolution, and similarly, each channel (column) at the lower resolution of the source bitmap will be divided into 12 columns at the higher resolution. In the example depicted in FIGS. 10A–10J and 11A–11C, a word size of 36 bits is illustrated, which is chosen only for illustrative purposes. If a 32-bit microprocessor was used in a particular computer or laser primer, then only 24 pels would preferably be evaluated during a particular cycle of the microprocessor's operation. However, if a 64-bit microprocessor were used, then up to 5 pels from the source bitmap could be evaluated, which would then be using a word size of 60 pels at the expanded bitmap resolution. From this description, it is obvious that the method of the present invention works most efficiently when evaluating and manipulating pels in groups that correspond to the boundaries between channels (or columns) of the lower resolution pels. Furthermore, it will be understood that the end pels of each word are preferably evaluated twice— once with respect to their abutting left-hand pel, and again with respect to their abutting right-hand pel.

Ignoring any physical constraints of microprocessor or data bus size, the example starting on FIG. 10A will be illustrated with word sizes of 36 pels. Since the expansion factor n=12, the first transition boundary 400 will occur between rows 12 and 13. This is calculated at function block 208 on the flow chart of FIG. 6A, in which REG.1 is loaded with the bitmap data from row 12 (=Yn, which equals 1×12), and REG.2 is loaded with bitmap data from row 13 (=Yn+1).

Figure 10B:
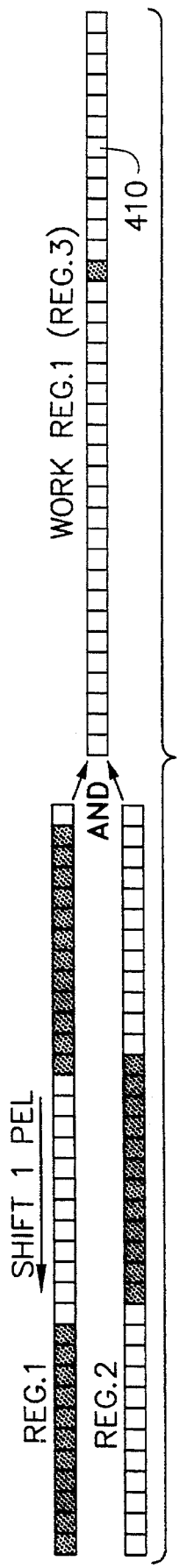
FIGS. 10B–10I are diagrams showing the logical data manipulations of the first pass through the Inner Loop to smooth the two-dimensional bitmap image of FIG. 10A.
Figure 10C:
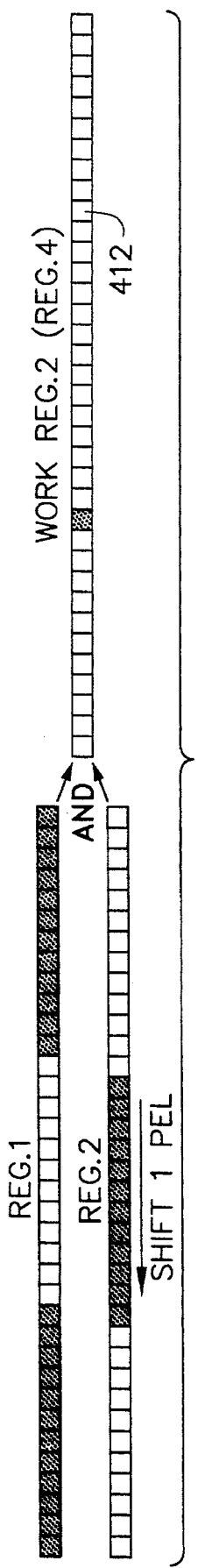

Now that REG.1 and REG.2 are loaded with bitmap data, the first pass through the Inner Loop can be executed, and as illustrated in FIG. 10B, REG.1 is shifted one pel to the left, AND-ed with REG.2, and the result is placed in WORK REG.1 (also called REG.3), at index numeral 410. In FIG. 10C, REG.2 is shifted one pel to the left, AND-ed with REG.1, and the result placed in WORK REG.2 (also called REG.4), at index numeral 412. These operations are executed according to function blocks 212 and 214 on the flow chart of FIG. 6A.

Figure 10D:
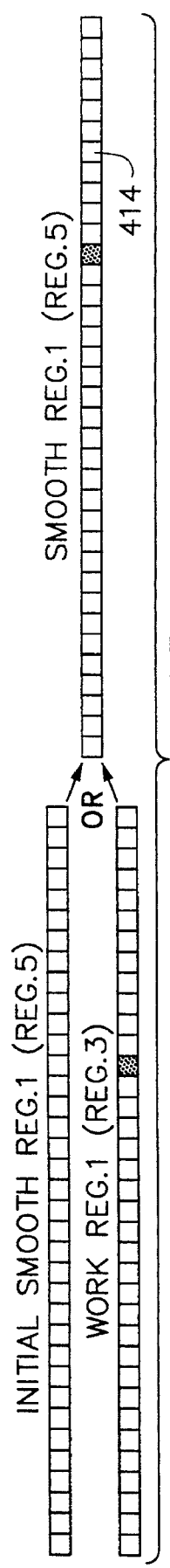
Figure 10E:
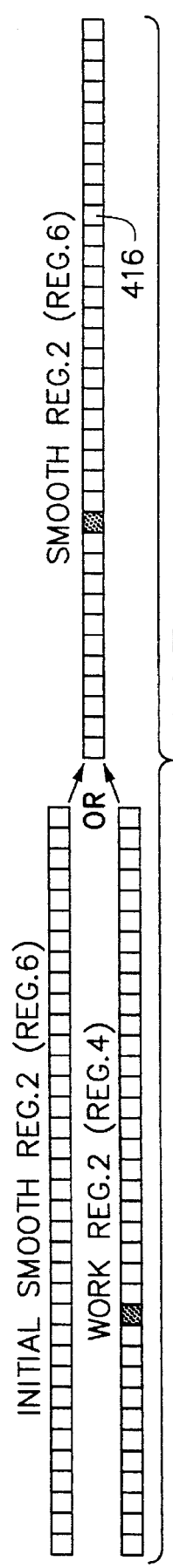

In FIG. 10D, the initially cleared SMOOTH REG.1 (also called REG.5) is OR-ed with WORK REG.1, with result placed in SMOOTH REG.1 at index numeral 414. In FIG. 10 E, the initially cleared SMOOTH REG.2 (also called REG.6) is OR-ed with WORK REG.2, and the result placed in SMOOTH REG.2 at index numeral 416. These operations are executed according to function blocks 216 and 218 on the flow chart of FIG. 6A.

Figure 10F:
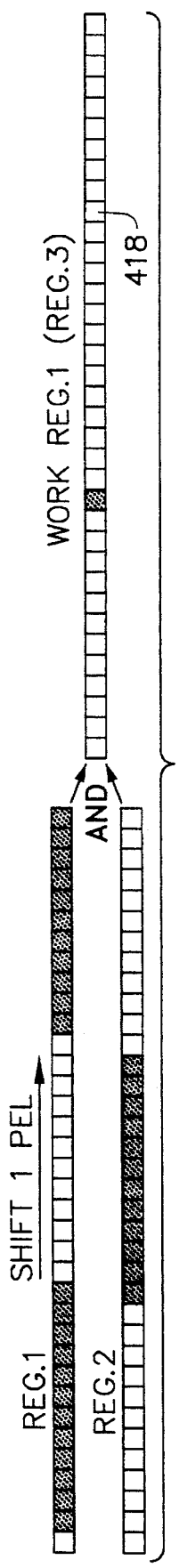
Figure 10G:
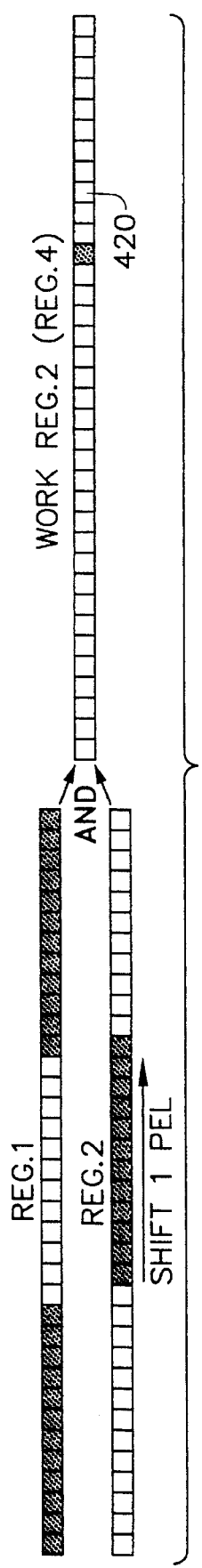
Figure 10H:
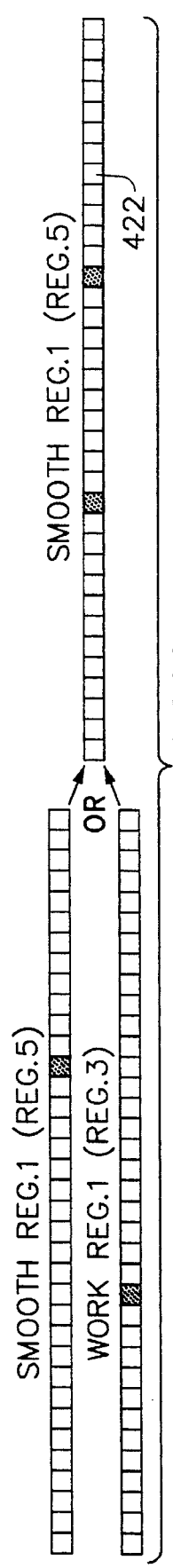
Figure 10I:
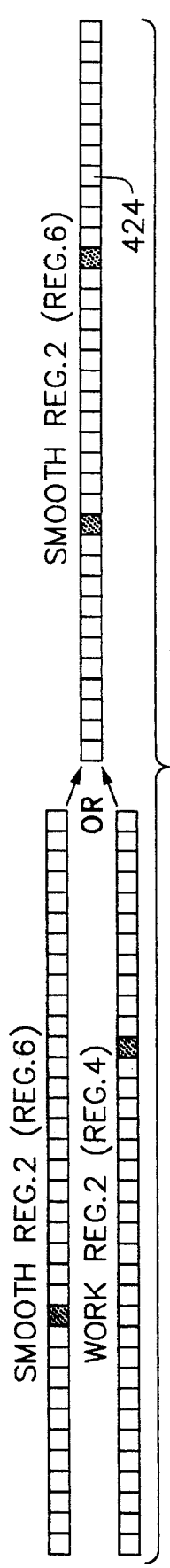
Figure 10J:
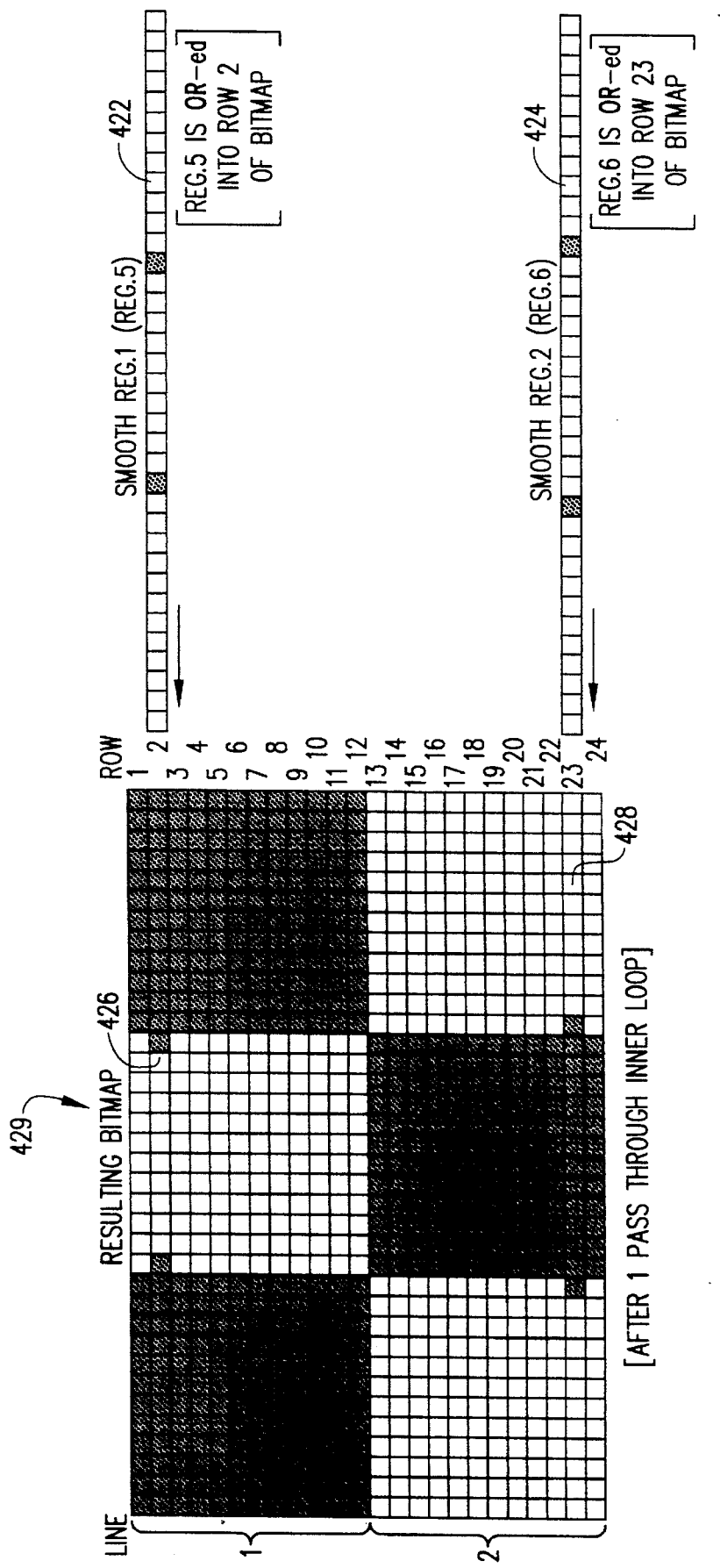
FIG. 10J is a two-dimensional representation of the 12× expanded, partially smoothed high-resolution bitmap image of FIG. 10A at the end of the first pass through the Inner Loop.

As viewed on FIG. 10F, REG.1 is now shifted one pel to the right, AND-ed with REG.2, and the result placed in WORK REG.1 at index numeral 418. In FIG. 10G, REG.2 is shifted one pel to the right, AND-ed with REG.1, and the result placed in WORK REG.2 at index numeral 420. In FIG. 10H, SMOOTH REG.1 is OR-ed with WORK REG.1, with the result placed in SMOOTH REG.1 at index numeral 422. In FIG. 10I, SMOOTH REG.2 is OR-ed with WORK REG.2, with the results placed in SMOOTH REG.2 at index numeral 424. The operations of FIG. 10F–10I are executed according to the function blocks 220, 222, 224, and 226 on the flow chart of FIG. 6A.

The SMOOTH registers are now in condition to be OR-ed with the respective rows of the original bitmap depicted in FIG. 10A. According to function block 220, SMOOTH REG.1 (i.e, REG.5) is to be OR-ed with row 2 of the bitmap. In the equation of function block 228, Y=1, n=12, and Z=1; the result thereby equaling 2. Similarly, SMOOTH REG.2 (i.e., REG.6) is to be OR-ed with row 23 of the bitmap, according to function block 230 on the flow chart of FIG. 6B. In the equation of function block 230, Y=1, n=12, and Z=1; thereby resulting in a numerical result of 23.

The result of the first OR operation (on row 2) is a smoothed row 2 at index numeral 426 on the resulting bitmap 429. The result of the second OR-operation (on row 23) will be a smoothed row 23 at the index numeral 428 on the resulting bitmap 429. After this first pass through the Inner Loop, decision block 232 will determine that Z is not equal to the quantity (n−1), and Z will be incremented at function block 234 and the logical flow will be directed back to function block 212 for the next pass through the Inner Loop.

At the end of the second pass through the Inner Loop, the evaluation of function block 228 will point to row 3, as shown in FIG. 11A at the index numeral 442 on the resulting bitmap 440. The evaluation of function block 230 will point to row 22, resulting in a smoothed row 22 at the index numeral 444 on the resulting bitmap 440.

After a third pass through the Inner Loop, the evaluation of function block 228 will point to row 4, resulting in a smoothed row 4 at the index numeral 452 on the resulting bitmap 450. The evaluation of function block 230 will point to row 21, resulting in a smoothed row 21 at the index numeral 454 on the resulting bitmap 450.

Figure 11C:
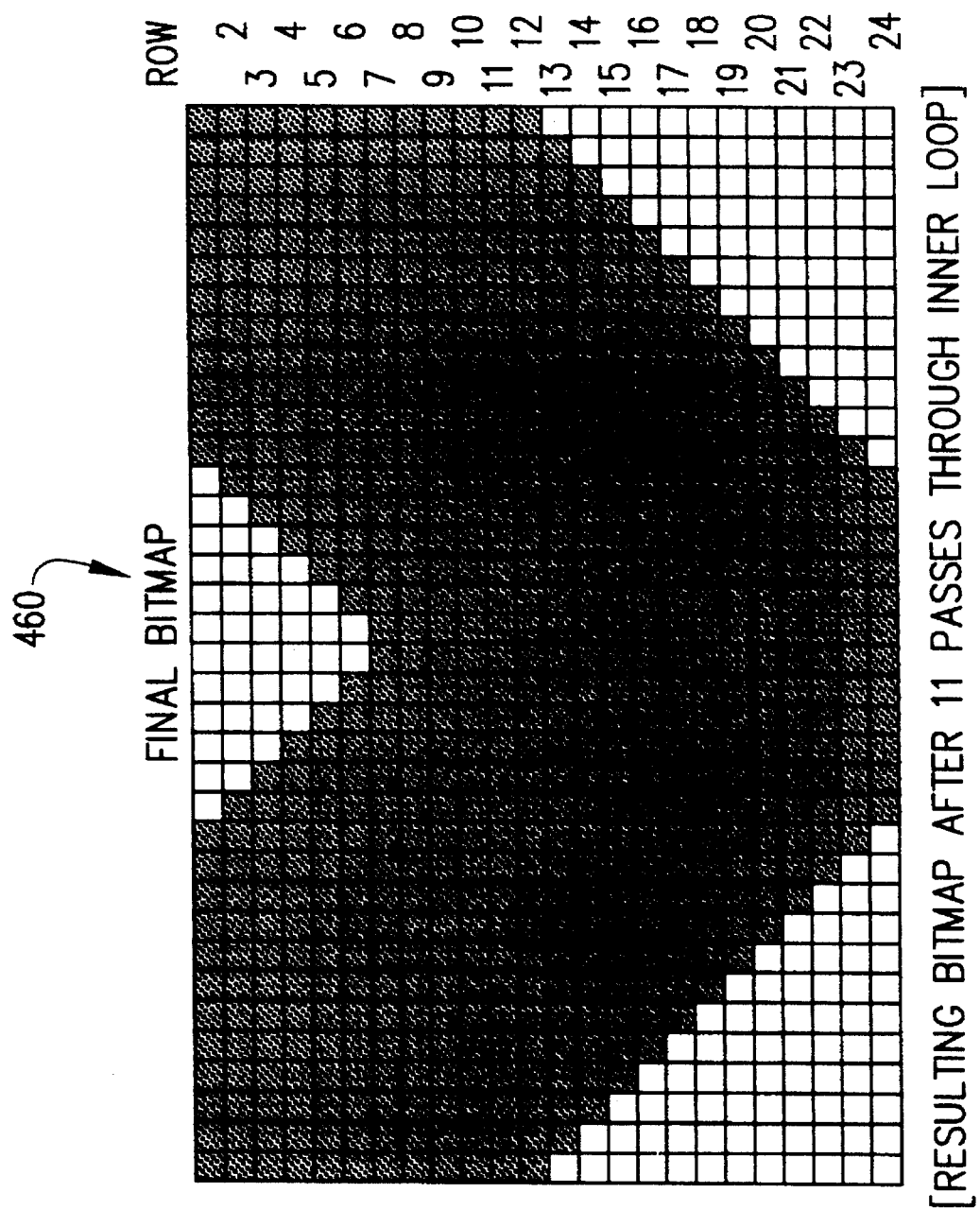
FIG. 11C is a two-dimensional representation of the 12× expanded, completely smoothed high-resolution bitmap image of FIGS. 10A and 11B at the end of the eleventh (and final) pass through the Inner Loop.

After eleven passes through the Inner Loop, the final bitmap designated by the index numeral 460 will have the appearance as depicted on FIG. 11C. Each of the rows has been individually smoothed according to the flow chart on FIGS. 6A and 6B, and the result is a series of small steps at a 45 degree angle instead of one large incremental step as viewed in FIG. 10A.

The advantages of the present invention are that the same process steps are performed regardless of the expansion factor used in converting the source bitmap to the higher resolution bitmap, and that the process steps do not depend upon evaluating any special locations where certain transitions occur in the original data of the source bitmap. The method steps could be accomplished by use of a software program in a sequential microprocessor system, or even in a parallel processing system in which, for example, multiple Inner Loops and/or Outer Loops are executed simultaneously. Furthermore, if very high speed is desired, most of the method steps could be accomplished in discrete logic dedicated to performing the smoothed expansion of bitmaps for rasterized images or printed pages.

It will be further understood that the present bitmap expansion procedure could be accomplished on a microprocessor located on a laser printer (as according to the illustrated embodiment), or it could be accomplished on a separate computer that contains a source bitmap such that the rasterization process would be performed on that same separate computer along with the smoothing bitmap expansion technique of the present invention. The result of the execution on the separate computer could be an output data stream that is communicated to a video monitor or to a laser printer configured to receive bitmap data that already has been rasterized.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. In a computer system having memory storage devices and an output for communicating image data to an output apparatus that presents image data in a visually sensible format, a method of smoothing two-state image data where a lower resolution bitmap is to be depicted at an expanded, higher resolution, and wherein said expansion is to be at an integer multiple of the lower resolution, said method comprising the steps of:

(a) loading into a first memory a first data set of image information having a first resolution in pels per inch, said first data set comprising a bitmap having a plurality of pels arranged in lines and channels;

(b) expanding and smoothing said first data set, thereby creating a second data set of image information having a second, higher resolution in pels per inch, said second data set initially comprising an unsmoothed, expanded data set of image information arranged as a bitmap having a plurality of pels arranged in rows and columns that correspond at said integer multiple expansion to the lines and channels of said first data set, said second data set having a plurality of transition boundaries which correspond to the delineation between the lines of pels in said first data set, said rows having their individual pels arranged in groups of words, by:

(i) determining an expansion factor, which is an integer value equal to the second resolution divided by the first resolution;

(ii) progressively loading words of the two rows of data at each of the transition boundaries into a second memory;

(A) progressively shifting to the left one or more pels of each one of said two rows and AND-ing each individual result with the other of said two rows, and storing the individual results into a third memory;

(B) progressively OR-ing each individual result stored in said third memory with an initially cleared value stored in a fourth memory, and storing the individual results into said fourth memory;

(C) progressively shifting to the right one or more pels of each one of said two rows and AND-ing each individual result with the other of said two rows, and storing the individual results into said third memory;

(D) progressively OR-ing each individual result stored in said third memory with said value stored in said fourth memory, and storing the individual results into said fourth memory;

(E) progressively OR-ing said individual results stored in said fourth memory with the respective rows of image information of said second data set, thereby creating an expanded and smoothed bitmap of said second data set of image information; and (iii) progressively performing the above steps upon all words in each group of rows of data between each of the transition boundaries, until the entire second data set of image information has been operated upon;

wherein the computer system communicates said second data set of image information, now in an expanded and smoothed form, to the output apparatus that presents said second data set in a visually sensible format.

2. The method as recited in claim 1, further comprising the step of printing on paper said second data set using a print engine of said output apparatus, thereby creating a hard-copy output corresponding to said second data set of image information, said output apparatus comprising a laser printer that contains the computer system.

3. The method as recited in claim 1, further comprising the step of printing on paper said second data set using a print engine of said output apparatus, thereby creating a hard-copy output corresponding to said second data set of image information, said output apparatus comprising a high-resolution printer that stands separate from said computer system and receives rasterized data in the form of said expanded and smoothed second data set of image information from said computer system.

4. The method as recited in claim 1, wherein said expansion factor has an integer value in the range of 2 to 12, inclusive.

5. In a computer system having memory storage devices and an output for communicating image data to an output apparatus that presents image data in a visually sensible format, a method of smoothing two-state image data where a lower resolution bitmap is to be depicted at an expanded, higher resolution, and wherein said expansion is to be at an integer multiple of the lower resolution, said method comprising the steps of:

(a) loading into a first memory a first data set of image information having a first resolution in pels per inch, said first data set comprising a bitmap having a plurality of pels arranged in lines and channels;

(b) expanding and smoothing said first data set, thereby creating a second data set of image information having a second, higher resolution in pels per inch, said second data set initially comprising an unsmoothed, expanded data set of image information arranged as a bitmap having a plurality of pels arranged in rows and columns that correspond at said integer multiple expansion to the lines and channels of said first data set, said second data set having a plurality of transition boundaries which correspond to the delineation between the lines of pels in said first data set, said rows having their individual pels arranged in groups of words, by:

(i) determining an expansion factor, n, which is an integer value equal to the second resolution divided by the first resolution;

(ii) initializing a variable Y, which corresponds to one of said lines, initializing a pointer, which corresponds to the location of one of the words in line Y, entering an outer loop by loading a first register with bitmap data from said word for row (Yn), and loading a second register with bitmap data from said word for row [(Yn)+1];

(iii) initializing a variable Z, clearing the contents of a fifth register, clearing the contents of a sixth register, entering an inner loop by:

(A) shifting to the left by Z pels said first register, AND-ing the result with said second register, and loading the result into a third register;

(B) shifting to the left by Z pels said second register, AND-ing the result with said first register, and loading the result into a fourth register;

(c) OR-ing said third and fifth registers and loading the result into said fifth register;

(D) OR-ing said fourth and sixth registers and loading the result into said sixth register;

(E) shifting to the right by Z pels said first register, AND-ing the result with said second register, and loading the result into said third register;

(F) shifting to the right by Z pels said second register, AND-ing the result with said first register, and loading the result into said fourth register;

(G) OR-ing said third and fifth registers and loading the result into said fifth register;

(H) OR-ing said fourth and sixth registers and loading the result into said sixth register;

(I) OR-ing the contents of said fifth register with bitmap row $[(Y-1)n+(Z+1)]$ of said second memory, storing the smoothed result of bitmap row $[(Y-1)n+(Z+1)]$ in said second memory;

(J) OR-ing the contents of said sixth register with bitmap row $[(Y)n+(n-Z)]$ of said second memory, storing the smoothed result of bitmap row $[(Y)n+(n-Z)]$ in said second memory;

(iv) if $Z<(n-1)$, incrementing Z and re-entering said inner loop by performing all of said inner loop operations, if $Z=(n-1)$, setting said pointer to the next word of bitmap data in the present line Y and entering said outer loop by performing all of said outer loop operations, unless the present word is at the end of the present line; and (v) incrementing Y, initializing said pointer, and re-entering said outer loop by performing all of said outer loop operations, unless the present word is at the end of the bitmap of said second data set of image information;

wherein the computer system communicates said second data set of image information, now in an expanded and smoothed form, to the output apparatus that presents said second data set in a visually sensible format.

6. The method as recited in claim 5, further comprising the step of printing on paper said second data set using a print engine of said output apparatus, thereby creating a hard-copy output corresponding to said second data set of image information, said output apparatus comprising a laser printer that contains the computer system.

7. The method as recited in claim 5, further comprising the step of printing on paper said second data set using a print engine of said output apparatus, thereby creating a hard-copy output corresponding to said second data set of image information, said output apparatus comprising a high-resolution printer that stands separate from said computer system and receives rasterized data in the form of said expanded and smoothed second data set of image information from said computer system.

8. The method as recited in claim 5, wherein the step of initializing said variable Y sets the value of Y to 1, the step of initializing said pointer sets the pointer to the first word in line Y, the step of initializing said variable X sets the value of X to 1, the step of clearing the contents of said fifth register sets those contents to the value of 0, the step of clearing the contents of said sixth register sets those contents to the value of 0, the step of incrementing Z increases its value by 1, and the step of incrementing Y increases its value by 1.

9. The method as recited in claim 5, wherein said expansion factor has an integer value in the range of 2 to 12, inclusive.

10. A laser printer having a data input port, a processing circuit including at least one memory storage device, a rasterizing graphics engine, and a print engine, said data input port receiving two-state image data at a lower resolution, said laser printer comprising:

(a) a first temporary memory to which the received lower resolution image data is loaded, said first memory thereby containing a first data set of image information having a first resolution in pels per inch, said first data set comprising a bitmap having a plurality of pels arranged in lines and channels;

(b) a second temporary memory to which a second data set of image information is loaded, said second data set of image information having a higher resolution in pels per inch, said second data set initially comprising an unsmoothed, expanded data set of image information arranged as a bitmap having a plurality of pels arranged in rows and columns that correspond to an integer multiple of the lines and channels of said first data set, wherein said integer multiple is an expansion factor equal to the higher resolution divided by the lower resolution, said second data set having a plurality of transition boundaries which correspond to the delineation between the lines of pels in said first data set, said rows having their individual pels arranged in groups of words;

(c) a plurality of registers as part of the rasterizing graphics engine, including first and second registers into which words of the two rows of data at each of the transition boundaries are progressively loaded;

(d) said plurality of registers also including third and fourth registers; after the progressive loading into said first and second registers, the contents of each one of said two rows are progressively shifted to the left by one or more pels, individually AND-ed with the other of said two rows, then individually progressively stored into said third and fourth registers;

(e) said plurality of registers also including fifth and sixth registers which are initially cleared; the contents of said third and fifth registers are progressively OR-ed and the result progressively stored in said fifth register; the contents of said fourth and sixth registers are progressively OR-ed and the result progressively stored in said sixth register;

(f) the contents of each one of said two rows in said first and second registers additionally being progressively shifted to the right by one or more pels, individually AND-ed with the other of said two rows, then individually progressively stored into said third and fourth registers;

(g) the contents of said third and fifth registers additionally being progressively OR-ed and the result progressively stored in said fifth register; the contents of said fourth and sixth registers additionally being progressively OR-ed and the result progressively stored in said sixth register;

(h) the contents of each of said fifth and sixth registers additionally being progressively OR-ed with the respective rows of image information of said second data set, thereby creating an expanded and smoothed bitmap of said second data set of image information; and (i) said prim engine, after receiving the expanded and smoothed bitmap of said second data set of image information, creating a two-state hard-copy of image data in a visually sensible format based upon the expanded and smoothed higher resolution.

11. The laser printer as recited in claim 10, wherein the processing circuit comprises a sequential microprocessor with associated random access memory and read only memory.

12. The laser printer as recited in claim 11, wherein the random access memory is used for the operations pertaining to the rasterizing graphics engine, and includes said first temporary memory, second temporary memory, and said plurality of registers.

13. The laser printer as recited in claim 10, wherein the processing circuit comprises a parallel processor system having associated random access memory and read only memory.

14. The laser primer as recited in claim 13, wherein the random access memory is used for the operations pertaining to the rasterizing graphics engine, and includes said first temporary memory, second temporary memory, and said plurality of registers.

15. The laser printer as recited in claim 10, wherein said expansion factor has an integer value in the range of 2 to 12, inclusive.

16. A computer system having a processing circuit including at least one memory storage device, a rasterizing graphics engine, and a data output port for communicating image data to an output apparatus that presents image data in a visually sensible format at a high resolution, said computer system comprising:

(a) a first temporary memory to which lower resolution image data is stored, said first memory thereby containing a first data set of image information having a first resolution in pels per inch, said first data set comprising a bitmap having a plurality of pels arranged in lines and channels;

(b) a second temporary memory to which a second data set of image information is loaded, said second data set of image information having a higher resolution in pels per inch, said second data set initially comprising an unsmoothed, expanded data set of image information arranged as a bitmap having a plurality of pels arranged in rows and columns that correspond to an integer multiple of the lines and channels of said first data set, wherein said integer multiple is an expansion factor equal to the higher resolution divided by the lower resolution, said second data set having a plurality of transition boundaries which correspond to the delineation between the lines of pels in said first data set, said rows having their individual pels arranged in groups of words;

(c) a plurality of registers as part of the rasterizing graphics engine, including first and second registers into which words of the two rows of data at each of the transition boundaries are progressively loaded;

(d) said plurality of registers also including third and fourth registers; after the progressive loading into said first and second registers, the contents of each one of said two rows are progressively shifted to the left by one or more pels, individually AND-ed with the other of said two rows, then individually progressively stored into said third and fourth registers;

(e) said plurality of registers also including fifth and sixth registers which are initially cleared; the contents of said third and fifth registers are progressively OR-ed and the result progressively stored in said fifth register; the contents of said fourth and sixth registers are progressively OR-ed and the result progressively stored in said sixth register;

(f) the contents of each one of said two rows in said first and second registers additionally being progressively shifted to the right by one or more pels, individually AND-ed with the other of said two rows, then individually progressively stored into said third and fourth registers;

(g) the contents of said third and fifth registers additionally being progressively OR-ed and the result progressively stored in said fifth register; the contents of said fourth and sixth registers additionally being progressively OR-ed and the result progressively stored in said sixth register; and (h) the contents of each of said fifth and sixth registers additionally being progressively OR-ed with the respective rows of image information of said second data set, thereby creating an expanded and smoothed bitmap of said second data set of image information.

17. The computer system as recited in claim 16, wherein the output apparatus comprises a laser printer that receives the expanded and smoothed bitmap of said second data set of image information via said data output port, thereby creating a two-state hard-copy of image data in a visually sensible format based upon the expanded and smoothed higher resolution.

18. The computer system as recited in claim 17, wherein the processing circuit comprises a sequential microprocessor with associated random access memory and read only memory.

19. The computer system as recited in claim 18, wherein the random access memory is used for the operations pertaining to the rasterizing graphics engine, and includes said first temporary memory, second temporary memory, and said plurality of registers.

20. The computer system as recited in claim 17, wherein the processing circuit comprises a parallel processor system having associated random access memory and read only memory.

21. The computer system as recited in claim 20, wherein the random access memory is used for the operations pertaining to the rasterizing graphics engine, and includes said first temporary memory, second temporary memory, and said plurality of registers.

22. The computer system as recited in claim 17, wherein said expansion factor has an integer value in the range of 2 to 12, inclusive.

* * * * *